(12) United States Patent
Asahi et al.

(10) Patent No.: US 6,717,556 B2
(45) Date of Patent: Apr. 6, 2004

(54) MULTI-DISPLAY SYSTEM AND METHOD FOR MOVING WINDOWS IN MULTI-DISPLAY SYSTEM

(75) Inventors: Hiroyuki Asahi, Hyogo (JP); Isao Ogawa, Kyoto (JP); Youichi Kawabata, Hyogo (JP); Hitomi Fujisaki, Hyogo (JP); Shinichiro Morishita, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 178 days.

(21) Appl. No.: 09/893,822

(22) Filed: Jun. 28, 2001

(65) Prior Publication Data

US 2002/0075198 A1 Jun. 20, 2002

(30) Foreign Application Priority Data

Dec. 14, 2000 (JP) .................................... 2000-379862

(51) Int. Cl.[7] .............................................. G09G 5/00
(52) U.S. Cl. ....................................... 345/1.1; 345/788
(58) Field of Search .......................... 345/1.1, 1.3, 2.2, 345/748, 759, 700, 761, 781, 783, 788, 799

(56) References Cited

U.S. PATENT DOCUMENTS

| 5,533,183 A | * | 7/1996 | Henderson et al. .......... 345/854 |
| 6,023,277 A | * | 2/2000 | Osaka et al. ................ 345/419 |
| 6,100,936 A | * | 8/2000 | Jordan et al. ............... 348/552 |
| 6,254,481 B1 | * | 7/2001 | Jaffe ............................ 463/20 |

* cited by examiner

Primary Examiner—Richard Hjerpe
Assistant Examiner—Ronald Laneau
(74) Attorney, Agent, or Firm—Snell & Wilmer, LLP

(57) ABSTRACT

A multi-display system according to the present invention includes: first display means for displaying a plurality of first windows; second display means; and control means for controlling the first display means and the second display means. In response to a first predetermined input, the control means moves at least two of the plurality of first windows displayed on the first display means from the first display means onto the second display means.

28 Claims, 11 Drawing Sheets

MULTI-DISPLAY SYSTEM AND METHOD FOR MOVING WINDOWS IN MULTI-DISPLAY SYSTEM

BACKGROUND OF THE INVENTION

1. Field of the Invention

The present invention relates to a multi-display system, and in particular to a technique of moving windows among a plurality of display means in a multi-display system.

2. Description of the Related Art

In a conventional multi-display system incorporating a plurality of display means, when an operator wishes to move a window from one display means onto another, the window to be moved must be first designated with the use of a mouse cursor and then a location on the other (destination) display means to which the window is to be moved must be designated, again with the mouse cursor.

However, in order to move a window from one display means onto another in a conventional multi-display system incorporating a plurality of display means, the aforementioned operation of designating a window to be moved and designating a location on another (destination) display means to which the window is to be moved must be repeated for every one of the windows which need to be moved. This is quite cumbersome for the operator.

In addition, when two users are seated across from each other, with their respective display means placed "back to back" (i.e., so that each user can properly see their own display means), for example, the following problems may arise due to the opposite placement of the two display means. That is, a user facing one of the display means cannot easily confirm and designate a destination location on the display means to which the user wishes to move a window because of the opposite placement of the two display means.

SUMMARY OF THE INVENTION

In one aspect of the present invention, there is provided a multi-display system according to the present invention, comprising: first display means for displaying a plurality of first windows; second display means; and control means for controlling the first display means and the second display means, wherein, in response to a first predetermined input, the control means moves at least two of the plurality of first windows displayed on the first display means from the first display means onto the second display means.

In one embodiment of the invention, the control means moves all of the plurality of first windows displayed on the first display means from the first display means onto the second display means.

In another embodiment of the invention, in response to a second predetermined input, the control means moves at least one of the plurality of first windows displayed on the first display means from the first display means onto the second display means, in such a manner that a difference between a number of windows displayed on the first display means and a number of windows displayed on the second display means is one or less.

In still another embodiment of the invention, the control means comprises window movement instruction means for instructing a movement pattern for the at least one first window moved from the first display means onto the second display means in response to the second predetermined input.

In still another embodiment of the invention, the control means selects the at least one first window to be moved from the first display means onto the second display means in response to the second predetermined input, based on a predetermined priority level.

In still another embodiment of the invention, the predetermined priority level is determined based on a length of time which has elapsed since a most recent operation was performed to a window.

In still another embodiment of the invention, the second display means displays at least one second window; and the control means controls the second display means so as to display the at least one second window and the at least two first windows moved from the first display means onto the second display means in equal size.

In still another embodiment of the invention, the control means comprises: window movement instruction means for instructing a movement pattern for the at least two first windows moved from the first display means onto the second display means in response to the first predetermined input; window display means for displaying the at least two first windows on the first display means or on the second display means, based on display coordinate information representing locations at which the at least two first windows are to be displayed; and window destination determining means for updating the display coordinate information based on the movement pattern instructed by the window movement instruction means.

In still another embodiment of the invention, the multi-display system further comprises display region management means for managing a display region for a window to be displayed on the first display means or the second display means, wherein the window display means displays the window based on the display region as managed by the display region management means.

In still another embodiment of the invention, the first predetermined input is input to the control means as a result of a single operation.

In still another embodiment of the invention, the first display means and the second display means are placed back-to-back.

In still another embodiment of the invention, the first predetermined input comprises at least one of: an icon click; a key input; and information representing relative locations of the first display means and the second display means.

In another aspect of the present invention, there is provided a method for moving windows in a multi-display system, comprising: a first step of displaying a plurality of first windows on first display means; and a second step of for controlling the first display means and the second display means, wherein, the second step comprises, in response to a first predetermined input, moving at least two of the plurality of first windows displayed on the first display means from the first display means onto the second display means.

In one embodiment of the invention, the second step comprises moving all of the plurality of first windows displayed on the first display means from the first display means onto the second display means.

In another embodiment of the invention, the second step comprises, in response to a second predetermined input, moving at least one of the plurality of first windows displayed on the first display means from the first display means onto the second display means, in such a manner that a difference between a number of windows displayed on the first display means and a number of windows displayed on the second display means is one or less.

In still another embodiment of the invention, the second step comprises instructing a movement pattern for the at least one first window moved from the first display means onto the second display means in response to the second predetermined input.

In still another embodiment of the invention, the second step comprises selecting the at least one first window to be moved from the first display means onto the second display means in response to the second predetermined input, based on a predetermined priority level.

In still another embodiment of the invention, the predetermined priority level is determined based on a length of time which has elapsed since a most recent operation was performed to a window.

In still another embodiment of the invention, the second display means displays at least one second window; and the second step comprises controlling the second display means so as to display the at least one second window and the at least two first windows moved from the first display means onto the second display means in equal size.

In still another embodiment of the invention, the second step comprises: a third step of instructing a movement pattern for the at least two first windows moved from the first display means onto the second display means in response to the first predetermined input; a fourth step for displaying the at least two first windows on the first display means or on the second display means, based on display coordinate information representing locations at which the at least two first windows are to be displayed; and a fifth step for updating the display coordinate information based on the movement pattern instructed in the third step.

In still another embodiment of the invention, the second step comprises a sixth step for managing a display region for a window to be displayed on the first display means or the second display means, wherein the fourth step comprises displaying the window based on the display region as managed in the sixth step.

In still another embodiment of the invention, the first predetermined input is input as a result of a single operation.

In still another embodiment of the invention, the first display means and the second display means are placed back-to-back.

In still another embodiment of the invention, the first predetermined input comprises at least one of: an icon click; a key input; and information representing relative locations of the first display means and the second display means.

According to one aspect of the present invention, it is possible to perform a series of complicated window operations by one action of an operator, whereby the burden on the operator can be reduced.

According to another aspect of the present invention, all of currently displayed windows can be gathered on a particular display means, or may be dispersed so that the number of windows to be displayed on the respective display means is equalized, with a simple and quick operation.

According to yet another aspect of the present invention, it is possible to display a plurality of windows on each display means in an orderly arrangement, with a simple and quick operation.

Thus, the invention described herein makes possible the advantage of providing a multi-display system which is capable of moving a plurality of windows from one display means to another display means through a simple operation.

This and other advantages of the present invention will become apparent to those skilled in the art upon reading and understanding the following detailed description with reference to the accompanying figures.

DESCRIPTION OF THE PREFERRED EMBODIMENTS

The principle of the present invention is realized based on the function of a control means which, in response to a first predetermined input, moves at least two of a plurality of first windows which are displayed on a first display means from the first display means onto a second display means. Hereinafter, the present invention will be described by way of illustrative examples, with reference to the accompanying figures.

EXAMPLE 1

Figure 1:
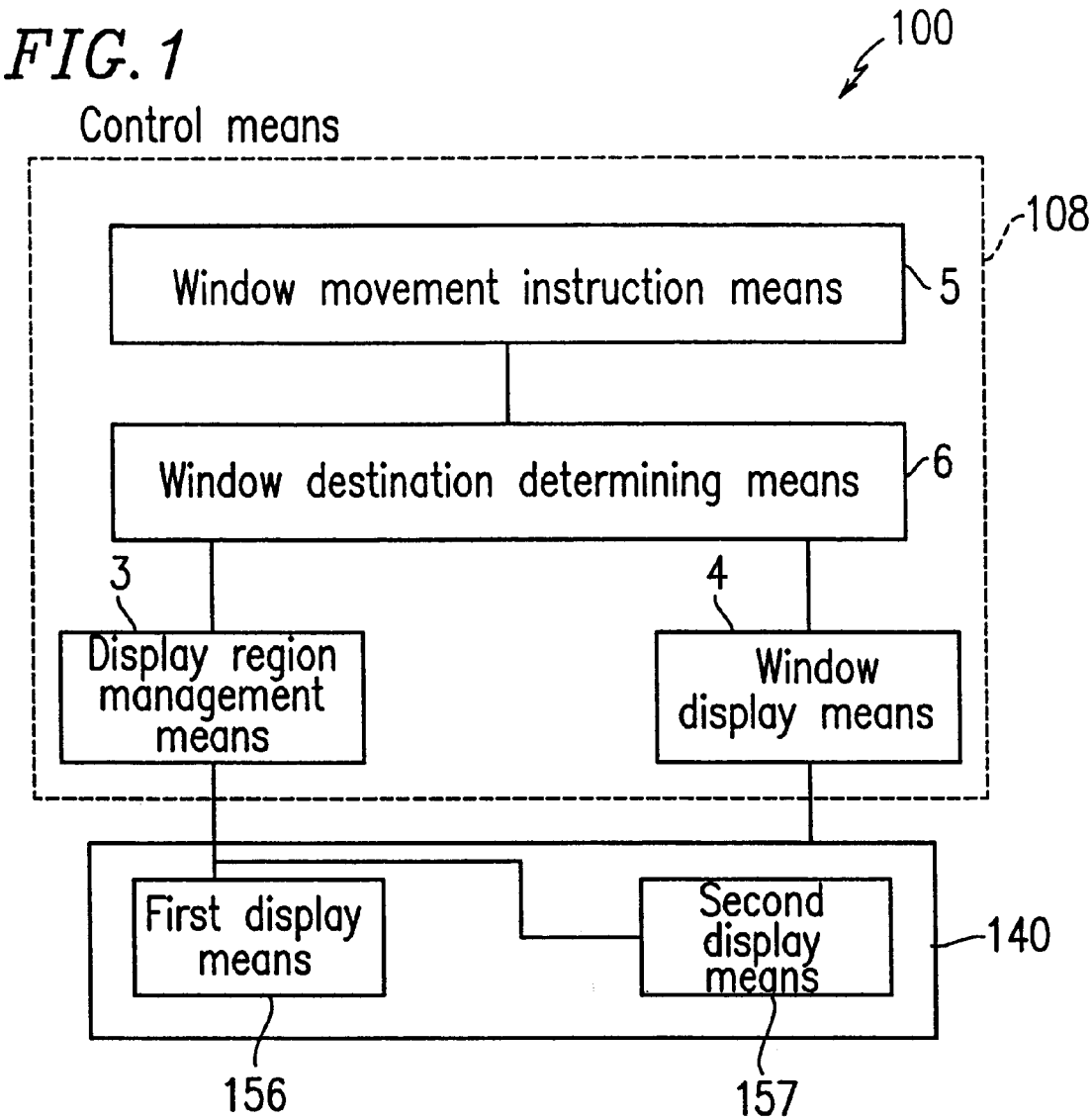
FIG. 1 is a block diagram illustrating a multi-display system 100 according to Example 1 of the present invention.

Example 1 is directed to a process of moving a window(s) which has a relatively high priority level for display among a plurality of display means. FIG. 1 is a block diagram illustrating a multi-display system 100 according to Example 1 of the present invention.

The multi-display system 100 includes: display means 140 including a first display means 156 and a second display means 157; and a control means 108 for controlling the first display means 156 and the second display means 157. In response to a predetermined input, the control means 108 moves at least one of a plurality of first windows displayed on the first display means 156 from the first display means 156 onto the second display means 157. The first display means 156 and the second display means 157 are preferably disposed in opposite (i.e., back-to-back) orientations.

An exemplary structure for the control means 108 will be described. The control means 108 includes: a display region management means 3 for managing display regions for windows which are to be displayed on the first display means 156 or the second display means 157; a window display means 4 for displaying windows on the first display means 156 or the second display means 157 in accordance with the window display regions as managed by the display region management means 3; a window movement instruction means 5 for instructing a movement pattern according to which a window is to be moved between the first display means 156 and the second display means 157; and a window destination determining means 6 for determining a destination to which a window is to be moved according to an instruction from the window movement instruction means 5.

Figure 2:
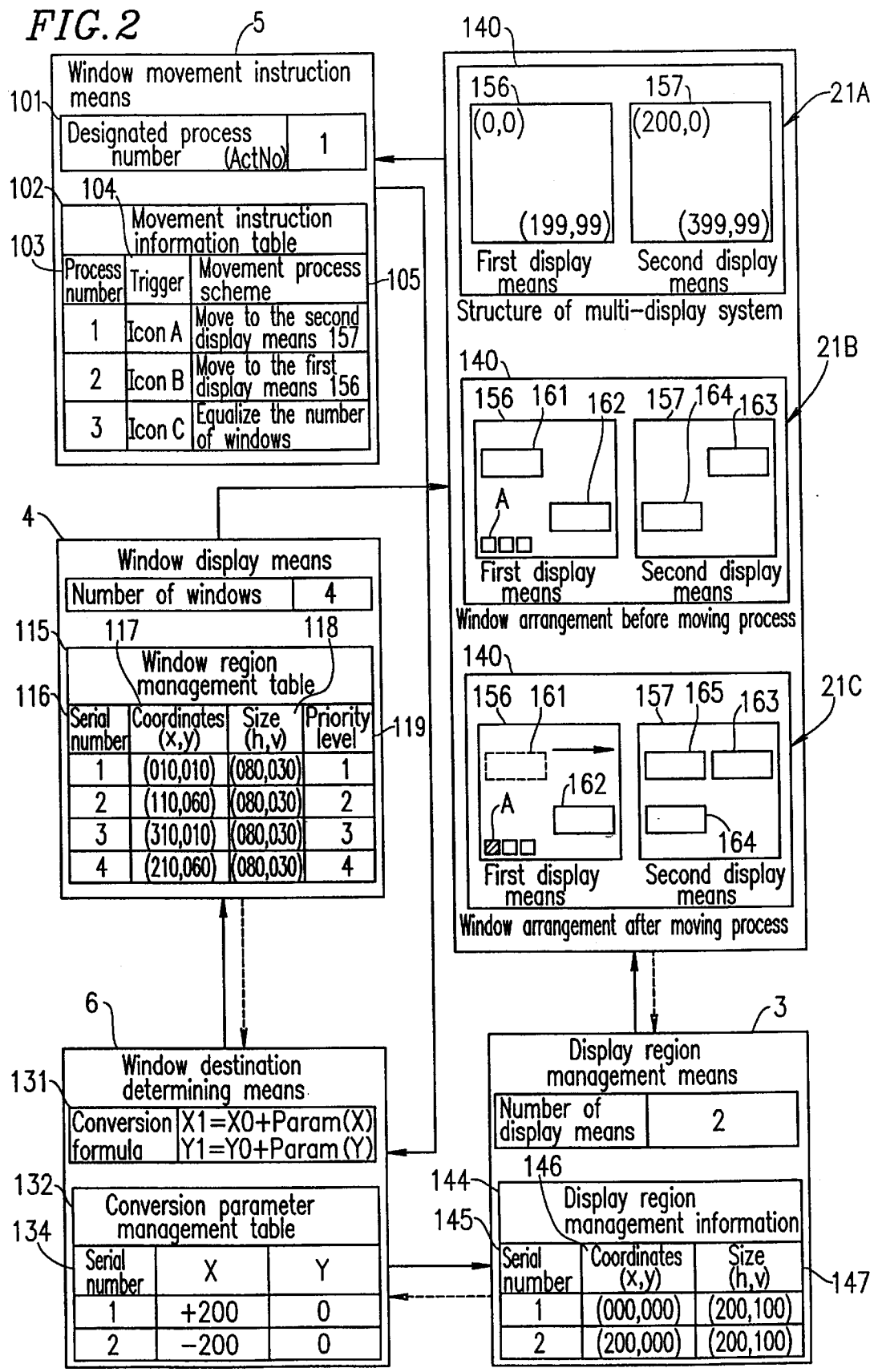
FIG. 2 is a diagram illustrating a process of moving a window having a relatively high priority level for display among a plurality of display means through an icon operation according to Example 1 of the present invention.

FIG. 2 is a diagram illustrating a process of moving a window having a relatively high priority level for display among a plurality of display means through an icon operation.

As described above with reference to FIG. 1, the display means 140 in the multi-display system 100 according to Example 1 of the present invention includes the first display means 156 and the second display means 157, as shown in a display state 21A in FIG. 2. As shown in the display state 21A, the entire display region on the first display means 156 spans a range defined by X-Y coordinates (0,0) and X-Y coordinates (199,99), whereas the entire display region on the second display means 157 spans a range defined by X-Y coordinates (200,0) and X-Y coordinates (399,99).

A display state 21B shown in FIG. 2 represents a state of windows displayed on the first display means 156 and the second display means 157 before a moving process is performed. On the first display means 156, a window 161 is displayed in a display region whose span can be defined by X-Y coordinates (10,10) and X-Y coordinates (89,39), and a window 162 is displayed in a display region whose span can be defined by X-Y coordinates (110,60) and X-Y coordinates (189,89). On the second display means 157, a window 163 is displayed in a display region whose span can be defined by X-Y coordinates (310,10) and X-Y coordinates (389,39), and a window 164 is displayed in a display region whose span can be defined by X-Y coordinates (210,60) and X-Y coordinates (289,89).

First, the initialization of various management tables employed in the respective means will be described.

As shown in FIG. 2, the display region management means 3 includes display region management information 144. For each and every one of the display means that are coupled to the display region management means 3 (i.e., the first display means 156 and the second display means 157 in this case), a serial number 145, coordinate information 146 defining the entire display region, and size information 147 are set in the display region management information 144.

In the present example, as shown in FIG. 2, the first display means 156 has assigned thereto a serial number "1", coordinate information (0,0) defining its entire display region, and information (200,100) representing the size of the entire display region. The second display means 157 has assigned thereto a serial number "2", coordinate information (200,0) defining its entire display region, and information (200,100) representing the size of the entire display region.

The window display means 4 includes a window region management table 115 for managing a number of windows which are displayed on all of the display means (i.e., the first display means 156 and the second display means 157) which are managed by the display region management means 3. For each window, the window display means 4 sets in the window region management table 115: a serial number 116, coordinates 117 at which the window is displayed, displayed size 118, and a priority level for display 119.

According to the present example, in the display state 21B in FIG. 2, the windows 161 and 162 displayed on the first display means 156 have serial numbers "1" and "2" assigned thereto, respectively. The windows 163 and 164 displayed on the second display means 157 have serial numbers "3" and "4" assigned thereto, respectively. For each of the windows 161, 162, 163, and 164, the coordinates 117, the displayed size 118, and the priority level for display 119 are set as shown in FIG. 2.

In the movement instruction information table 102, the window movement instruction means 5 sets various movement process schemes 105 which are applicable to windows that are displayed on all of the display means managed by the display region management means 3, as well as process numbers 103 and triggers 104 for such movement processes.

In the present example, it is assumed that one of the following three movement processes can be instructed as a movement process scheme 105 for a window: "move to the second display means 157", "move to the first display means 156", and "equalize the number of windows" (to be displayed on the first display means 156 and the second display means 157). For each movement process, one of process numbers "1" to "3" and a trigger for the movement process "(click on) icon A", "(click on) icon B", or "(click on) icon C" are assigned and stored in the movement instruction information table 102.

The window destination determining means 6 has a conversion formula 131 for calculating the coordinates of a destination for a window. The window destination determining means 6 sets, in a conversion parameter management table 132, a conversion parameter (X) along a horizontal direction and a conversion parameter (Y) along a vertical direction, which are to be used in the conversion formula 131. For each set of conversion parameters X and Y, a serial number 134 which is equal to the process number 103 of each movement process specified by the respective movement process scheme 105 as set in the movement instruction information table 102 is assigned.

In the present example, (+200, 0) is set in the conversion parameter management table 132, together with serial number "1", as conversion parameters (X, Y) corresponding to the movement process "move to the second display means 157" represented by process number "1" in the movement instruction information table 102. Similarly, (−200, 0) is set in the conversion parameter management table 132, together with serial number "2", as conversion parameters (X, Y) corresponding to the movement process "move to the first display means 156" represented by process number "2" in the movement instruction information table 102.

Now, a process of moving one of a plurality of windows displayed on the first display means 156 that has the highest priority level for display from the first display means 156 to the second display means 157 will be described. The priority level for display of a given window according to Example 1 is determined by and changes with the length of time which has elapsed since a most recent operation was performed to that window, such that the highest priority level is given to a window(s) for which the shortest time has elapsed since a most recent operation was performed thereto. Accordingly, it can be inferred that any number of windows which have high priority levels for display are the window(s) which the operator is currently working on.

The first predetermined input includes a click event representing that an icon has been clicked on with a mouse. However, the present invention is not limited thereto. The first predetermined input may be information representing a key input which is made via a keyboard. Alternatively, the first predetermined input may be information which represents relative locations of the first display means 156 and the second display means 157, e.g., an opposite (or back-to-back) placement of the first display means 156 and the second display means 157.

As shown in the display state 21C in FIG. 2, if the window movement instruction means 5 detects a click event ("first predetermined input") indicating that icon A has been clicked on with a mouse, the window movement instruction means 5 checks whether or not the detected event corresponds to a trigger 104 in the movement instruction information table 102. A click event may be input to the window movement instruction means 5 as a result of a single mouse operation.

Since the click event indicating that icon A has been clicked on with a mouse corresponds to a trigger 104 in the movement instruction information table 102, the window movement instruction means 5 sets process number "1", which corresponds to the trigger 104 indicating that icon A has been clicked on with a mouse, in a designated process number 101. Accordingly, process number "1" is passed to the window destination determining means 6.

The window destination determining means 6 checks the window region management table 115 in the window display means 4, and acquires the coordinates of a window which has the highest priority level for display. If the acquired coordinates do not fit within the display region of the second display means 157, the window destination determining means 6 calculates the coordinates of an appropriate destination for this window in accordance with the conversion formula 131, using the conversion parameters (X, Y) associated with serial number "1" in the conversion parameter management table 132. The coordinates of the window 161 corresponding to process number "1" stored in the window region management table 115 are updated with the calculated coordinates.

As shown in the display state 21C in FIG. 2, the window display means 4 redisplays the window 161 as the window 165, based on the updated coordinates of the window 161 in the window region management table 115 associated with process number "1".

Figure 3:
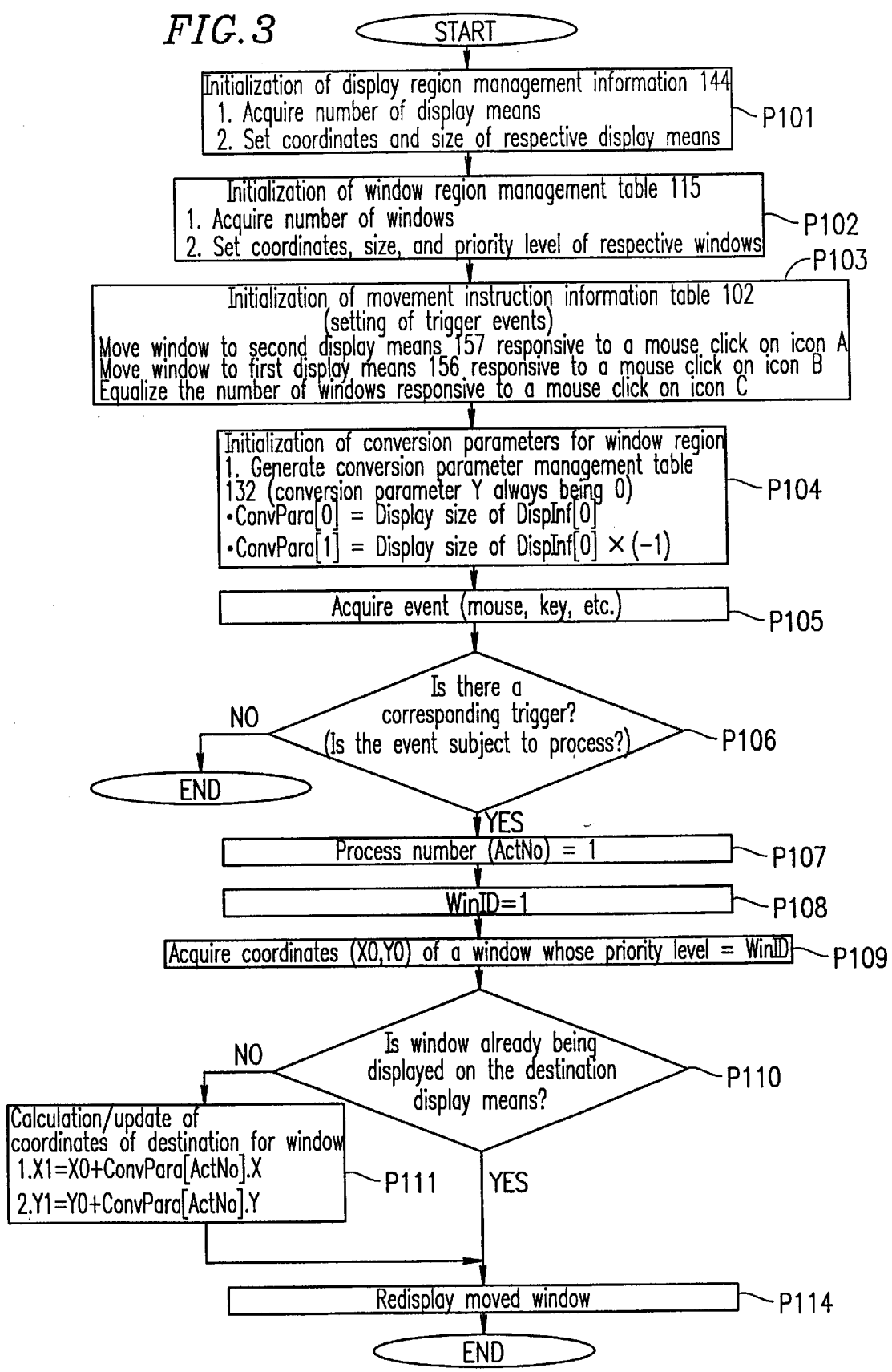
FIG. 3 is a flowchart illustrating a process of moving a window having a relatively high priority level for display among a plurality of display means according to Example 1 of the present invention.

FIG. 3 is a flowchart illustrating a process of moving a window having a relatively high priority level for display among a plurality of display means according to Example 1 of the present invention.

At step P101, the display region management means 3 detects all of the display means which are coupled to the display region management means 3, and stores the number of such display means. Moreover, the display region management means 3 sets in the display region management information 144 the respective serial numbers 145 identifying all of the display means coupled to the display region management means 3, as well as the coordinate information defining the entire display region 146 of each display means, and information representing the size of the entire display region 147 of each display means.

At step P102, the window display means 4 detects the windows which are displayed on all of the display means coupled to the display region management means 3 and stores the number of such windows. For each window, the window display means 4 sets in the window region management table 115: a serial number 116, coordinates 117 at which the window is displayed, displayed size 118, and a priority level for display 119.

At step P103, the window movement instruction means 5 sets in the movement instruction information table 102 various movement process schemes 105 which are applicable to windows that are displayed on all of the display means managed by the display region management means 3, as well as process numbers 103 and triggers 104 for such movement processes. At step P104, the window destination determining means 6 sets in the conversion parameter management table 132 a set of conversion parameters to be used in the conversion formula 131 for calculating the coordinates of a destination for the relevant window. At step P105, input events from a mouse or a keyboard are checked at regular periods of time and such events are acquired as triggers.

At step P106, the window movement instruction means 5 checks whether or not the trigger acquired at step P105 is a "(click on) icon A" event among the triggers 104 which were set in the movement instruction information table 102 at step P103. If the acquired trigger is not the "(click on) icon A" event among the triggers which were set in the movement instruction information table 102 at step P103 (following the "NO" path from step P106), then the process is terminated. If the acquired trigger is the "(click on) icon A" event among the triggers which were set in the movement instruction information table 102 at step P103 (following the "YES" path from step P106), then the process proceeds to step P107.

At step P107, a process number corresponding to the trigger acquired at step P106 is stored in the designated process number 101 in the window movement instruction means 5. At step P108, a window-identification counter WinID is initialized to "1". At step P109, the coordinates of a window having a priority level which is designated by the window-identification counter WinID are acquired from the window region management table 115.

At step P110, from the coordinates of the window having a priority level which is designated by the window-identification counter WinID (acquired at step P109), the window destination determining means 6 determines whether or not the window is already being displayed on the destination display means. If the window is already displayed, the process proceeds to step P114. If the window is not displayed, the process proceeds to step P111.

At step P111, the window destination determining means 6 calculates the coordinates of a destination for the window having a priority level which is designated by the window-identification counter WinID, and updates the coordinates stored in the window region management table 115 with the calculated coordinates of the destination. At step P114, the window display means 4 redisplays the window in accordance with the coordinates in the window region management table 115, as updated by the window destination determining means 6 at step P111.

Although an exemplary process in which one of the two windows displayed on the first display means 156 which has the higher priority level for display is moved onto the second display means 157 is illustrated above, the present invention is not limited thereto. Among M windows (where M is a natural number) displayed on the first display means 156, N windows (where N is an integer which is equal to or greater than 2, such that M>N) which have higher priority levels for display may be moved onto the second display means 157. Alternatively, N windows (where N is an integer which is equal to or greater than 2, such that M>N) which have higher priority levels for display among M windows (where M is a natural number) displayed on the second display means 157 may be moved onto the first display means 156 in response to a trigger which indicates "(click on) icon B", corresponding to the movement process "move to the first display means 156".

Although a control means which includes the display region management means 3, the window display means 4, the window movement instruction means 5, and the window destination determining means 6 is described in Example 1, the structure of the control means is not limited thereto. It will be appreciated that the control means according to the present invention may move at least one of a plurality of first windows displayed on the first display means 156 from the first display means 156 onto the second display means 157 in response to a predetermined input.

As described above, according to Example 1 of the present invention, at least one of a plurality of windows displayed on the first display means 156 can be automatically moved from the first display means 156 onto the second display means 157, in response to a trigger which is input to the window movement instruction means 5 by means of a mouse, for example.

Since the control means automatically moves the window from the first display means 156 onto the second display means 157, it is possible to move, with an easy operation, one or more windows from the first display means 156 onto the second display means 157 even when the first display means 156 and the second display means 157 are disposed in an opposite placement.

Furthermore, according to Example 1 of the present invention, as a trigger is input to the window movement instruction means 5 via a single operation of a mouse, for example, at least two of a plurality of windows displayed on the first display means 156 can be automatically moved from the first display means 156 onto the second display means 157.

As a result, it is not necessary to repeat the operation of designating a window to be moved and designating a location on another (destination) display means to which the window is to be moved with the use of a mouse cursor for every one of the windows which need to be moved. Thus, the burden on the operator is substantially reduced.

EXAMPLE 2

According to Example 2 of the present invention, another type of operation of the multi-display system 100 according to the present invention (shown in FIG. 1) will be described. Specifically, Example 2 is directed to a process of gathering/moving all windows onto a particular display means.

The multi-display system 100 includes: display means 140 including a first display means 156 and a second display means 157; and a control means 108 for controlling the first display means 156 and the second display means 157. The control means 108 includes: a display region management means 3 for managing display regions for windows which are to be displayed on the first display means 156 or the second display means 157; a window display means 4 for displaying windows on the first display means 156 or the second display means 157 in accordance with the window display regions as managed by the display region management means 3; a window movement instruction means 5 for instructing a movement pattern according to which all of the windows displayed on the first display means 156 are to be moved onto the second display means 157; and a window destination determining means 6 for determining a destination to which a window is to be moved according to an instruction from the window movement instruction means 5.

Figure 4:
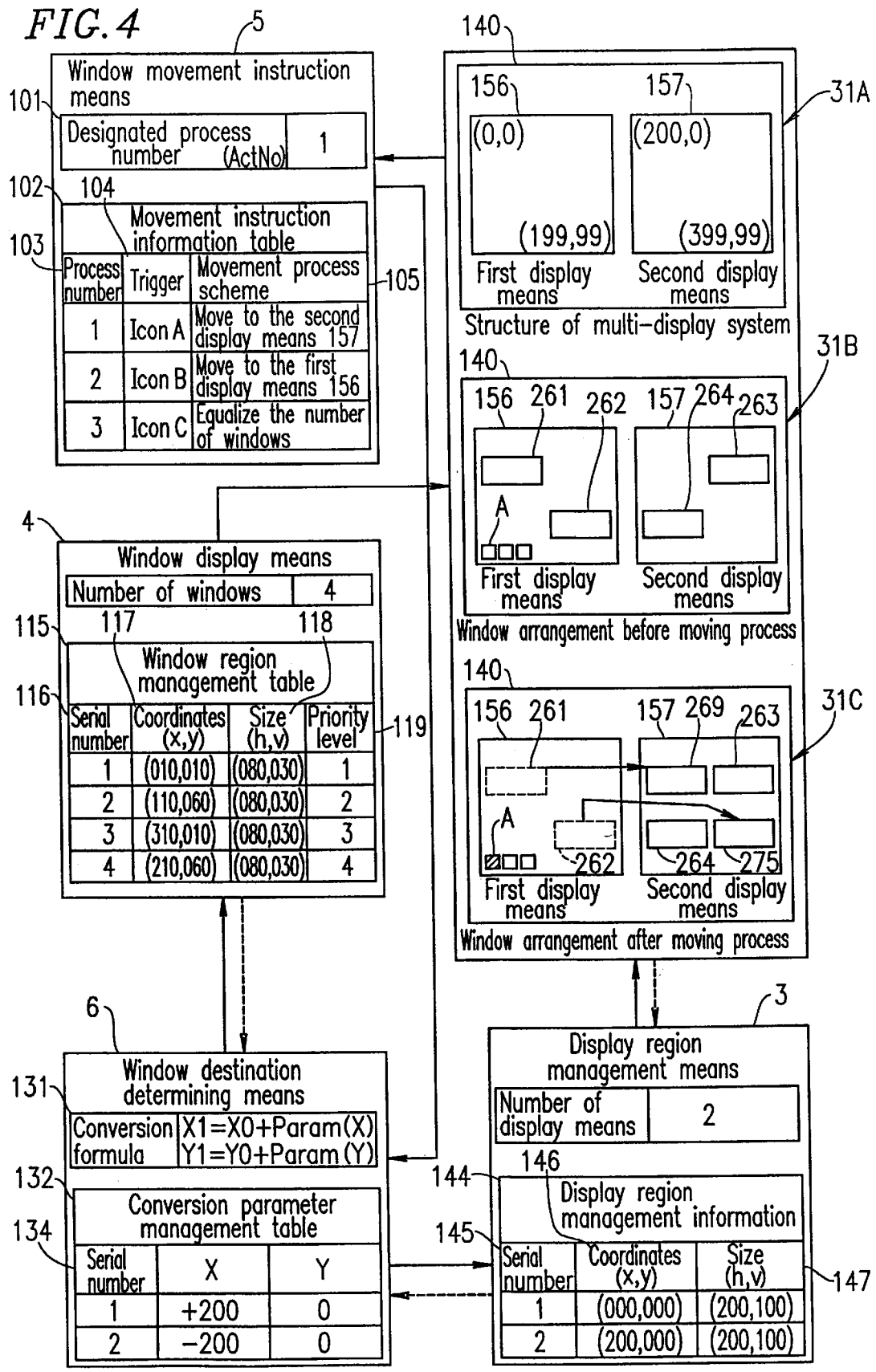
FIG. 4 is a diagram illustrating a process of moving all windows onto a particular display means through an icon operation according to Example 2 of the present invention.

FIG. 4 is a diagram illustrating a process of gathering/moving all windows onto a particular display means through an icon operation. The component elements which also appear in the process of moving a window having a relatively high priority level for display among a plurality of display means described with reference to FIG. 2 are denoted by the same reference numerals as those used therein, and the detailed descriptions thereof are omitted.

As described above with reference to FIG. 1, the display means 140 in the multi-display system 100 according to Example 2 of the present invention includes the first display means 156 and the second display means 157, as shown in a display state 31A in FIG. 4. Similarly to Example 1, as shown in the display state 31A, the entire display region on the first display means 156 spans a range defined by X-Y coordinates (0,0) and X-Y coordinates (199,99), whereas the entire display region on the second display means 157 spans a range defined by X-Y coordinates (200,0) and X-Y coordinates (399,99).

Similarly to Example 1, a display state 31B shown in FIG. 4 represents a state of windows displayed on the first display means 156 and the second display means 157 before a moving process is performed. On the first display means 156, a window 261 is displayed in a display region whose span can be defined by X-Y coordinates (10,10) and X-Y coordinates (89,39), and a window 262 is displayed in a display region whose span can be defined by X-Y coordinates (110,60) and X-Y coordinates (189,89). On the second display means 157, a window 263 is displayed in a display region whose span can be defined by X-Y coordinates (310,10) and X-Y coordinates (389,39), and a window 264 is displayed in a display region whose span can be defined by X-Y coordinates (210,60) and X-Y coordinates (289,89).

First, the initialization of various management tables employed in the respective means will be described.

Similarly to Example 1, as shown in FIG. 4, the display region management means 3 includes display region management information 144. For each and every one of the display means that are coupled to the display region management means 3 (i.e., the first display means 156 and the second display means 157 in this case), a serial number 145, coordinate information 146 defining the entire display region, and size information 147 are set in the display region management information 144.

In the present example, as shown in FIG. 4, the first display means 156 has assigned thereto a serial number "1", coordinate information (0,0) defining its entire display region, and information (200,100) representing the size of the entire display region. The second display means 157 has assigned thereto a serial number "2", coordinate information (200,0) defining its entire display region, and information (200,100) representing the size of the entire display region.

The window display means 4 includes a window region management table 115 for managing a number of windows which are displayed on all of the display means (i.e., the first display means 156 and the second display means 157) which are managed by the display region management means 3. For each window, the window display means 4 sets in the window region management table 115: a serial number 116, coordinates 117 at which the window is displayed, displayed size 118, and a priority level for display 119.

According to the present example, in the display state 31B in FIG. 4, the windows 261 and 262 displayed on the first display means 156 have serial numbers "1" and "2" assigned thereto, respectively. The windows 263 and 264 displayed on the second display means 157 have serial numbers "3" and "4" assigned thereto, respectively. For each of the windows 261, 262, 263, and 264, the coordinates 117, the displayed size 118, and the priority level for display 119 are set as shown in FIG. 4.

In the movement instruction information table 102, the window movement instruction means 5 sets various movement process schemes 105 which are applicable to windows that are displayed on all of the display means managed by the display region management means 3, as well as process numbers 103 and triggers 104 for such movement processes.

In the present example, it is assumed that one of the following three movement processes can be instructed as a movement process scheme 105 for a window: "move to the second display means 157", "move to the first display means 156", and "equalize the number of windows" (to be displayed on the first display means 156 and the second display means 157). For each movement process, one of process numbers "1" to "3" and a trigger for the movement process "(click on) icon A", "(click on) icon B", or "(click on) icon C" are assigned and stored in the movement instruction information table 102.

The window destination determining means 6 has a conversion formula 131 for calculating the coordinates of a destination for a window. The window destination determining means 6 sets, in a conversion parameter management table 132, a conversion parameter (X) along a horizontal direction and a conversion parameter (Y) along a vertical direction, which are to be used in the conversion formula 131. For each set of conversion parameters X and Y, a serial number 134 which is equal to the process number 103 of each movement process specified by the respective movement process scheme 105 as set in the movement instruction information table 102 is assigned.

In the present example, (+200, 0) is set in the conversion parameter management table 132, together with serial number "1", as conversion parameters (X, Y) corresponding to the movement process "move to the second display means 157" represented by process number "1 " in the movement instruction information table 102. Similarly, (−200, 0) is set in the conversion parameter management table 132, together with serial number "2", as conversion parameters (X, Y) corresponding to the movement process "move to the first display means 156" represented by process number "2" in the movement instruction information table 102.

Now, a process of moving all windows onto the second display means 157 will be described.

As shown in the display state 31C in FIG. 4, if the window movement instruction means 5 detects a click event ("first predetermined input") indicating that icon A has been clicked on with a mouse, the window movement instruction means 5 checks whether or not the detected event corresponds to a trigger 104 in the movement instruction information table 102. Since the click event indicating that icon A has been clicked on with a mouse corresponds to a trigger 104 in the movement instruction information table 102, the window movement instruction means 5 sets process number "1", which corresponds to the trigger 104 indicating that icon A has been clicked on with a mouse, in a designated process number 101. Accordingly, process number "1" is passed to the window destination determining means 6.

The window destination determining means 6 checks the window region management table 115 in the window display means 4, and acquires the coordinates of a window which has the highest priority level for display. If the acquired coordinates do not fit within the display region of the second display means 157, the window destination determining means 6 calculates the coordinates of an appropriate destination for this window in accordance with the conversion formula 131, using the conversion parameters (X, Y) associated with serial number "1" in the conversion parameter management table 132. The coordinates of the window 261 corresponding to process number "1" stored in the window region management table 115 are updated with the calculated coordinates.

Similarly, the coordinates of each and every one of the display means that are displayed on first display means 156 (i.e., the windows 261 and 262 in the exemplary case illustrated in FIG. 4) are converted by using the conversion formula 131, and the coordinates associated with all of the windows displayed on the first display means 156 are respectively updated with the coordinate values obtained through the conversion using the conversion formula 131.

As shown in the display state 31C in FIG. 4, the window display means 4 redisplays the window 261 as the window 269, and the window 262 as the window 275, based on the updated coordinates of the windows 261 and 262 in the window region management table 115 associated with process numbers "1" and "2".

Figure 5:
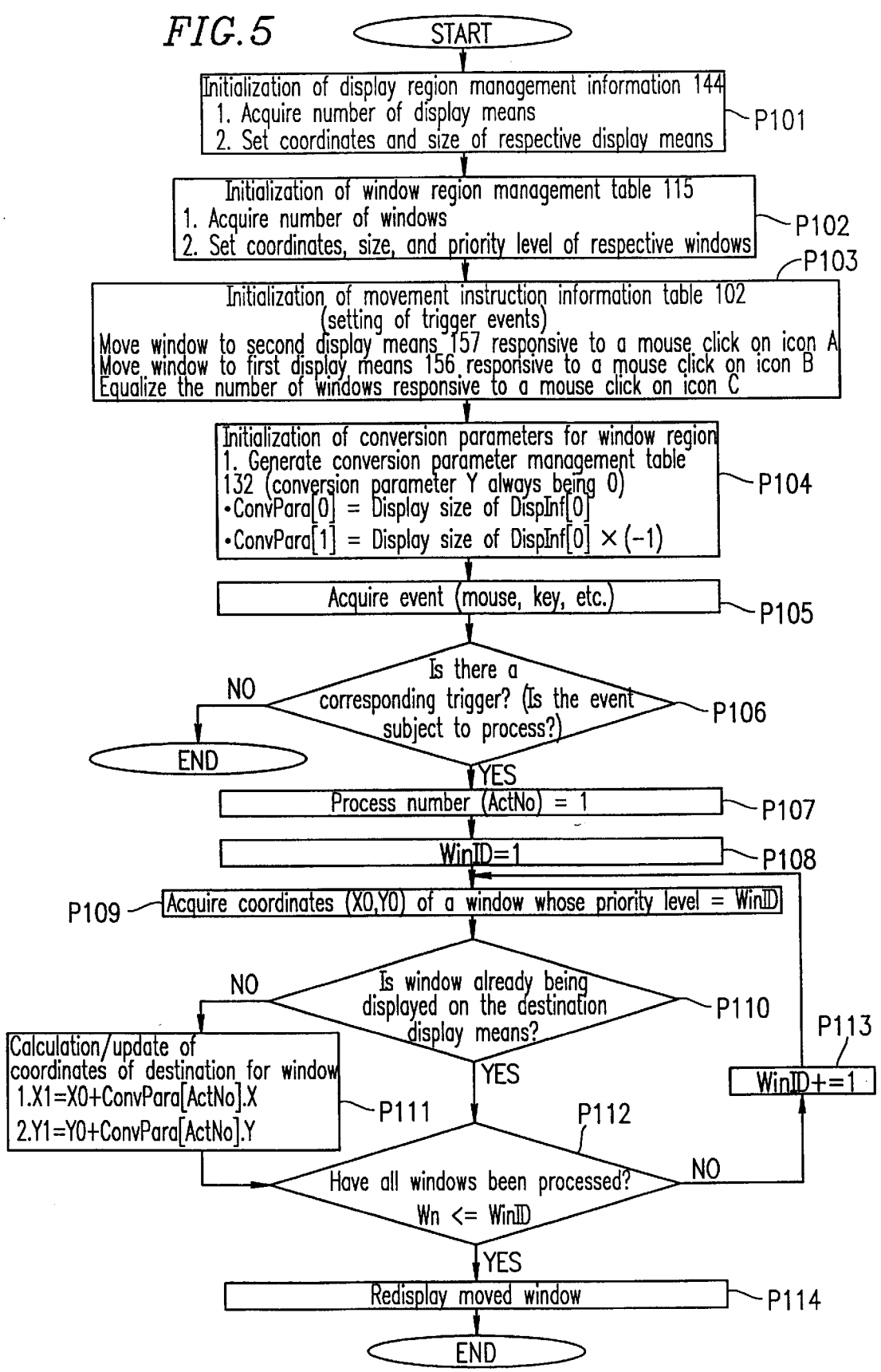
FIG. 5 is a flowchart illustrating a process of moving all of the windows displayed on a given display means onto another display means according to Example 2 of the present invention.

FIG. 5 is a flowchart illustrating a process of moving all of the windows displayed on a given display means onto another display means according to Example 2 of the present invention. The steps which also appear in the process of moving a window having a relatively high priority level for display among a plurality of display means described with reference to the flowchart of FIG. 3 are denoted by the same reference numerals as those used therein, and the detailed descriptions thereof are omitted.

At step P101, the display region management means 3 detects all of the display means which are coupled to the display region management means 3, and stores the number of such display means. Moreover, the display region management means 3 sets in the display region management information 144 the respective serial numbers 145 identifying all of the display means coupled to the display region management means 3, as well as the coordinate information defining the entire display region 146 of each display means, and information representing the size of the entire display region 147 of each display means.

At step P102, the window display means 4 detects the windows which are displayed on all of the display means coupled to the display region management means 3 and stores the number of such windows. For each window, the window display means 4 sets in the window region management table 115: a serial number 116, coordinates 117 at which the window is displayed, displayed size 118, and a priority level for display 119.

At step P103, the window movement instruction means 5 sets in the movement instruction information table 102 various movement process schemes 105 which are applicable to windows that are displayed on all of the display means managed by the display region management means 3, as well as process numbers 103 and triggers 104 for such movement processes. At step P104, the window destination determining means 6 sets in the conversion parameter management table 132 a set of conversion parameters to be used in the conversion formula 131 for calculating the coordinates of a destination for the relevant window. At step P105, input events from a mouse or a keyboard are checked at regular periods of time and such events are acquired as triggers.

At step P106, the window movement instruction means 5 checks whether or not the trigger acquired at step P105 is a "(click on) icon A" event among the triggers 104 which were set in the movement instruction information table 102 at step P103. If the acquired trigger is not the "(click on) icon A" event among the triggers which were set in the movement instruction information table 102 at step P103 (following the "NO" path from step P106), then the process is terminated. If the acquired trigger is the "(click on) icon A" event among the triggers which were set in the movement instruction information table 102 at step P103 (following the "YES" path from step P106), then the process proceeds to step P107.

At step P107, a process number corresponding to the trigger acquired at step P106 is stored in the designated process number 101 in the window movement instruction means 5. At step P108, a window-identification counter WinID is initialized to "1". At step P109, the coordinates of a window having a priority level which is designated by the window-identification counter WinID are acquired from the window region management table 115.

At step P110, from the coordinates of the window having a priority level which is designated by the window-identification counter WinID (acquired at step P109), the window destination determining means 6 determines whether or not the window is already being displayed on the destination display means. If the window is already displayed, the process proceeds to step P112. If the window is not displayed, the process proceeds to step P111.

At step P111, the window destination determining means 6 calculates the coordinates of a destination for the window having a priority level which is designated by the window-identification counter WinID, and updates the coordinates stored in the window region management table 115 with the calculated coordinates of the destination. At step P112, the window destination determining means 6 determines whether or not all of the windows have been processed (i.e., as known by the absence of a window having the next highest priority level for display). If there is not a window having the next highest priority level for display (following the "YES" path from step P112), the process proceeds to step P114. If such a window exists (following the "NO" path from step P112), the process proceeds to step P113.

At step P113, the priority level for display (i.e., the value of the window-identification counter WinID) is incremented by one, and the process proceeds to step P109. At step P114, the window display means 4 redisplays the window in accordance with the coordinates in the window region management table 115, as updated by the window destination determining means 6 at step P111.

Although an exemplary process in which all of the two windows displayed on the first display means 156 are moved on to the second display means 157 is illustrated above, the present invention is not limited thereto. All of M windows (where M is a natural number) displayed on the first display means 156 may be moved onto the second display means 157. Alternatively, all of M windows (where M is a natural number) displayed on the second display means 157 may be moved onto the first display means 156 in response to a trigger which indicates "(click on) icon B", corresponding to the movement process "move to the first display means 156".

As described above, according to Example 2 of the present invention, all of a plurality of windows displayed on the first display means 156 can be automatically moved from the first display means 156 onto the second display means 157, in response to a trigger which is input to the window movement instruction means 5 by means of a mouse, for example.

EXAMPLE 3

According to Example 3 of the present invention, yet another type of operation of the multi-display system 100 according to the present invention (shown in FIG. 1) will be described. Specifically, Example 3 is directed to a process of equalizing the number of windows to be displayed on each of a plurality of display means.

As used herein, "equalization" of the number of windows to be displayed on each of a plurality of display means is considered to have been attained when the difference between the numbers of windows displayed on the respective display means is reduced to one or less.

The multi-display system 100 includes: display means 140 including a first display means 156 and a second display means 157; and a control means 108 for controlling the first display means 156 and the second display means 157. The control means 108 includes: a display region management means 3 for managing display regions for windows which are to be displayed on the first display means 156 or the second display means 157, a window display means 4 for displaying windows on the first display means 156 or the second display means 157 in accordance with the window display regions as managed by the display region management means 3; a window movement instruction means 5 for instructing a movement pattern between the first display means 156 and the second display means 157; and a window destination determining means 6 for determining a destination to which a window is to be moved according to an instruction from the window movement instruction means 5.

Figure 6:
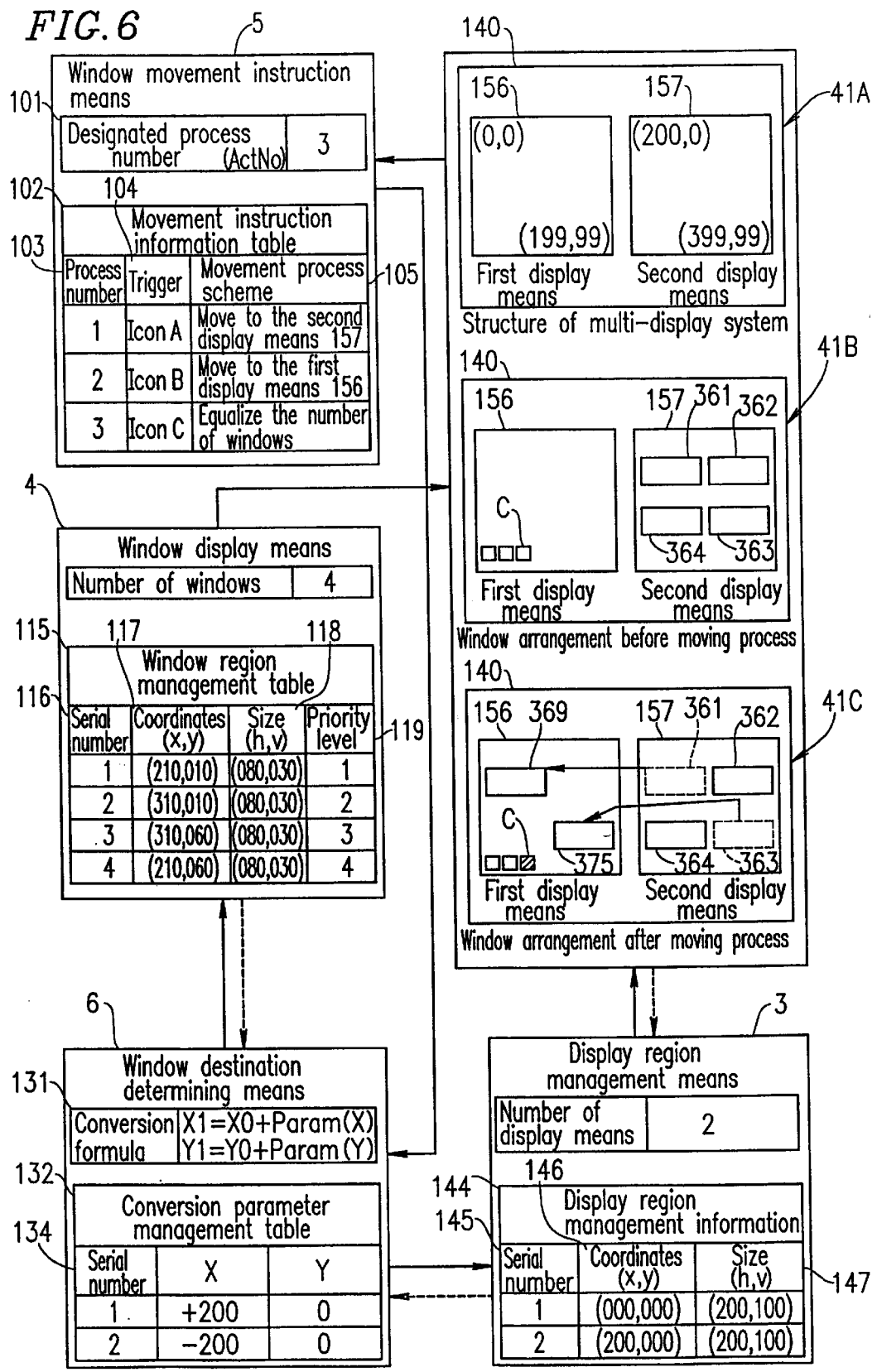
FIG. 6 is a diagram illustrating a process of equalizing the number of windows to be displayed on each of a plurality of display means through an icon operation, so that the difference between the numbers of windows displayed on the respective display means is one or less, according to Example 3 of the present invention.

FIG. 6 is a diagram illustrating a process of equalizing the number of windows to be displayed on each of a plurality of display means through an icon operation (so that the difference between the numbers of windows displayed on the respective display means is one or less). The component elements which also appear in the process of moving a window having a relatively high priority level for display among a plurality of display means described with reference to FIG. 2 are denoted by the same reference numerals as those used therein, and the detailed descriptions thereof are omitted.

As described above with reference to FIG. 1, the display means 140 in the multi-display system 100 according to Example 3 of the present invention includes the first display means 156 and the second display means 157, as shown in a display state 41A in FIG. 6. Similarly to Example 1, as shown in the display state 41A, the entire display region on the first display means 156 spans a range defined by X-Y coordinates (0,0) and X-Y coordinates (199,99), whereas the entire display region on the second display means 157 spans a range defined by X-Y coordinates (200,0) and X-Y coordinates (399,99).

A display state 41B shown in FIG. 6 represents a state of windows displayed on the first display means 156 and the second display means 157 before a moving process is performed. On the second display means 157, a window 361 is displayed in a display region whose span can be defined by X-Y coordinates (210,10) and X-Y coordinates (289,39); a window 362 is displayed in a display region whose span can be defined by X-Y coordinates (310,60) and X-Y coordinates (389,89); a window 363 is displayed in a display region whose span can be defined by X-Y coordinates (310,10) and X-Y coordinates (389,39); and a window 364 is displayed in a display region whose span can be defined by X-Y coordinates (210,60) and X-Y coordinates (289,89).

First, the initialization of various management tables employed in the respective means will be described.

Similarly to Example 1, as shown in FIG. 6, the display region management means 3 includes display region management information 144. For each and every one of the display means that are coupled to the display region management means 3 (i.e., the first display means 156 and the second display means 157 in this case), a serial number 145, coordinate information 146 defining the entire display region, and size information 147 are set in the display region management information 144.

In the present example, as shown in FIG. 6, the first display means 156 has assigned thereto a serial number "1", coordinate information (0,0) defining its entire display region, and information (200,100) representing the size of the entire display region. The second display means 157 has assigned thereto a serial number "2", coordinate information (200,0) defining its entire display region, and information (200,100) representing the size of the entire display region.

The window display means 4 includes a window region management table 115 for managing a number of windows which are displayed on all of the display means (i.e., the first display means 156 and the second display means 157) which are managed by the display region management means 3. For each window, the window display means 4 sets in the window region management table 115: a serial number 116, coordinates 117 at which the window is displayed, displayed size 118, and a priority level for display 119.

According to the present example, in the display state 41B in FIG. 6, the windows 361, 362, 363, and 364 displayed on the second display means 157 have serial numbers "1", "2", "3", and "4" assigned thereto, respectively. For each of the windows 361, 362, 363, and 364, the coordinates 117, the displayed size 118, and the priority level for display 119 are set as shown in FIG. 6.

In the movement instruction information table 102, the window movement instruction means 5 sets various movement process schemes 105 which are applicable to windows that are displayed on all of the display means managed by the display region management means 3, as well as process numbers 103 and triggers 104 for such movement processes.

In the present example, it is assumed that one of the following three movement processes can be instructed as a movement process scheme 105 for a window: "move to the second display means 157", "move to the first display means 156", and "equalize the number of windows" (to be displayed on the first display means 156 and the second display means 157). For each movement process, one of process numbers "1" to "3" and a trigger for the movement process "(click on) icon A", "(click on) icon B", or "(click on) icon C" are assigned and stored in the movement instruction information table 102.

The window destination determining means 6 has a conversion formula 131 for calculating the coordinates of a destination for a window. The window destination determining means 6 sets, in a conversion parameter management table 132, a conversion parameter (X) along a horizontal direction and a conversion parameter (Y) along a vertical direction, which are to be used in the conversion formula 131. For each set of conversion parameters X and Y, a serial number 134 which is equal to the process number 103 of each movement process specified by the respective movement process scheme 105 as set in the movement instruction information table 102 is assigned.

In the present example, (+200, 0) is set in the conversion parameter management table 132, together with serial number "1", as conversion parameters (X, Y) corresponding to the movement process "move to the second display means 157" represented by process number "1" in the movement instruction information table 102. Similarly, (−200, 0) is set in the conversion parameter management table 132, together with serial number "2", as conversion parameters (X, Y) corresponding to the movement process "move to the first display means 156" represented by process number "2" in the movement instruction information table 102.

Now, a process of equalizing the number of windows to be displayed on each of a plurality of display means (so that the difference between the numbers of windows displayed on the respective display means is one or less) will be described.

Similarly to the first predetermined input which has been described in Examples 1 and 2, the second predetermined input includes a click event representing that an icon has been clicked on with a mouse. However, the present invention is not limited thereto. The second predetermined input may be information representing a key input which is made via a keyboard. Alternatively, the second predetermined input may be information which represents relative locations of the first display means 156 and the second display means 157, e.g., an opposite (or back-to-back) placement of the first display means 156 and the second display means 157.

As shown in the display state 41C in FIG. 6, if the window movement instruction means 5 detects a click event ("second predetermined input") indicating that icon C has been clicked on with a mouse, the window movement instruction means 5 checks whether or not the detected event corresponds to a trigger 104 in the movement instruction information table 102. Since the click event indicating that icon C has been clicked on with a mouse corresponds to a trigger 104 in the movement instruction information table 102, the window movement instruction means 5 sets process number "1", which corresponds to the trigger 104 indicating that icon C has been clicked on with a mouse, in a designated process number 101. Accordingly, process number "3"is passed to the window destination determining means 6.

In response to process number "3", the window destination determining means 6 performs a coordinate conversion process for moving any windows whose priority level for display is indicated by an odd number to the first display means 156 and moving any windows whose priority level for display is indicated by an even number to the second display means 157. Specifically, the window destination determining means 6 checks the window region management table 115 in the window display means 4, and acquires the coordinates of the respective windows. For any window whose priority level for display is indicated by an odd number, if the acquired coordinates do not fit within the display region of the first display means 156, the window destination determining means 6 calculates the coordinates of an appropriate destination for this window in accordance with the conversion formula 131, using the conversion parameters (X, Y) associated with serial number "2"in the conversion parameter management table 132. For any window whose priority level for display is indicated by an even number, if the acquired coordinates do not fit within the display region of the second display means 157, the window destination determining means 6 calculates the coordinates of an appropriate destination for this window in accordance with the conversion formula 131, using the conversion parameters (X, Y) associated with serial number "1" in the conversion parameter management table 132. The coordinates of the windows stored in the window region management table 115 are updated with the respectively calculated coordinates.

As shown in the display state 41C in FIG. 6, the window display means 4 redisplays the window 361 as the window 369, and the window 362 as the window 375, based on the updated coordinates of the windows 361 and 362 in the window region management table 115 associated with process numbers "1" and "2".

Figure 7:
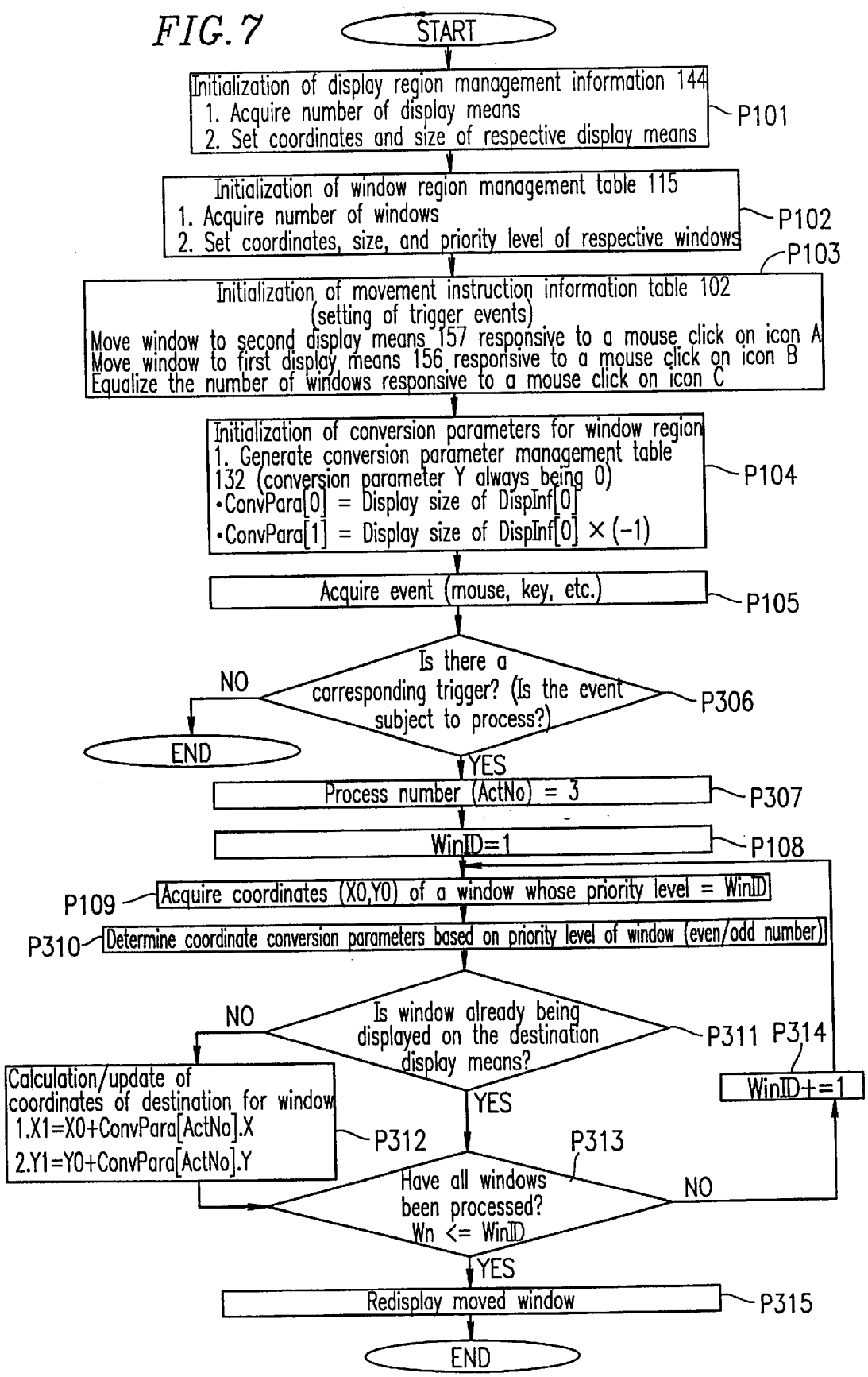
FIG. 7 is a flowchart illustrating a process of equalizing the number of windows to be displayed on each of a plurality of display means, so that the difference between the numbers of windows displayed on the respective display means is one or less, according to Example 3 of the present invention.

FIG. 7 is a flowchart illustrating a process of equalizing the number of windows to be displayed on each of a plurality of display means (so that the difference between the numbers of windows displayed on the respective display means is one or less) according to Example 3 of the present invention. The steps which also appear in the process of moving a window having a relatively high priority level for display among a plurality of display means described with reference to the flowchart of FIG. 3 are denoted by the same reference numerals as those used therein, and the detailed descriptions thereof are omitted.

At step P101, the display region management means 3 detects all of the display means which are coupled to the display region management means 3, and stores the number of such display means. Moreover, the display region management means 3 sets in the display region management information 144 the respective serial numbers 145 identifying all of the display means coupled to the display region management means 3, as well as the coordinate information defining the entire display region 146 of each display means, and information representing the size of the entire display region 147 of each display means.

At step P102, the window display means 4 detects the windows which are displayed on all of the display means coupled to the display region management means 3 and stores the number of such windows. For each window, the window display means 4 sets in the window region management table 115: a serial number 116, coordinates 117 at which the window is displayed, displayed size 118, and a priority level for display 119.

At step P103, the window movement instruction means 5 sets in the movement instruction information table 102 various movement process schemes 105 which are applicable to windows that are displayed on all of the display means managed by the display region management means 3, as well as process numbers 103 and triggers 104 for such movement processes. At step P104, the window destination determining means 6 sets in the conversion parameter management table 132 a set of conversion parameters to be used in the conversion formula 131 for calculating the coordinates of a destination for the relevant window. At step P105, input events from a mouse or a keyboard are checked at regular periods of time and such events are acquired as triggers.

At step P306, the window movement instruction means 5 checks whether or not the trigger acquired at step P105 is a "(click on) icon C" event among the triggers 104 which were set in the movement instruction information table 102 at step P103. If the acquired trigger is not the "(click on) icon C" event among the triggers which were set in the movement instruction information table 102 at step P103 (following the "NO" path from step P306), then the process is terminated. If the acquired trigger is the "(click on) icon C" event among the triggers which were set in the movement instruction information table 102 at step P103 (following the "YES" path from step P306), then the process proceeds to step P307.

At step P307, a process number corresponding to the trigger acquired at step P306 is stored in the designated process number 101 in the window movement instruction means 5. At step P108, a window-identification counter WinID is initialized to "1". At step P109, the coordinates of a window having a priority level which is designated by the window-identification counter WinID are acquired from the window region management table 115.

At step 310, the coordinate conversion parameters to be used for the conversion formula 131 are determined depending on whether the priority level designated by the window-identification counter WinID is an odd number or an even number.

At step P311, from the coordinates of the window having a priority level which is designated by the window-identification counter WinID (acquired at step P109), the window destination determining means 6 determines whether or not the window is already being displayed on the destination display means. If the window is already displayed, the process proceeds to step P313. If the window is not displayed, the process proceeds to step P312.

At step P312, the window destination determining means 6 calculates the coordinates of destinations for the windows, and updates the coordinates stored in the window region management table 115 with the calculated coordinates of the destinations. At step P313, the window destination determining means 6 determines whether or not all of the windows have been processed (i.e., as known by the absence of a window having the next highest priority level for display). If there is not a window having the next highest priority level for display (following the "YES" path from step P313), the process proceeds to step P315. If such a window exists (following the "NO" path from step P313), the process proceeds to step P314.

At step P314, the priority level for display (i.e., the value of the window-identification counter WinID) is incremented by one, and the process proceeds to step P109. At step P315, the window display means 4 redisplays the window in accordance with the coordinates in the window region management table 115, as updated by the window destination determining means 6 at step P111.

As described above, according to Example 3 of the present invention, at least one of a plurality of windows displayed on the second display means 157 can be automatically moved from the second display means 157 onto the first display means 156, in response to a trigger which is input to the window movement instruction means 5 by means of a mouse, for example, thereby ensuring that the difference between the number of windows displayed on the first display means 156 and the number of windows displayed on the second display means 157 is reduced to one or less.

Although an exemplary process in which windows are moved from the second display means 157 onto the first display means 156 is illustrated above, the present invention is not limited thereto. It will be appreciated that, in the case where more windows are initially displayed on the first display means 156 than on the second display means 157, at least one of a plurality of windows displayed on the first display means 156 can be automatically moved from the first display means 156 onto the second display means 157, thereby ensuring that the difference between the number of windows displayed on the first display means 156 and the number of windows displayed on the second display means 157 is reduced to one or less.

EXAMPLE 4

Figure 8:
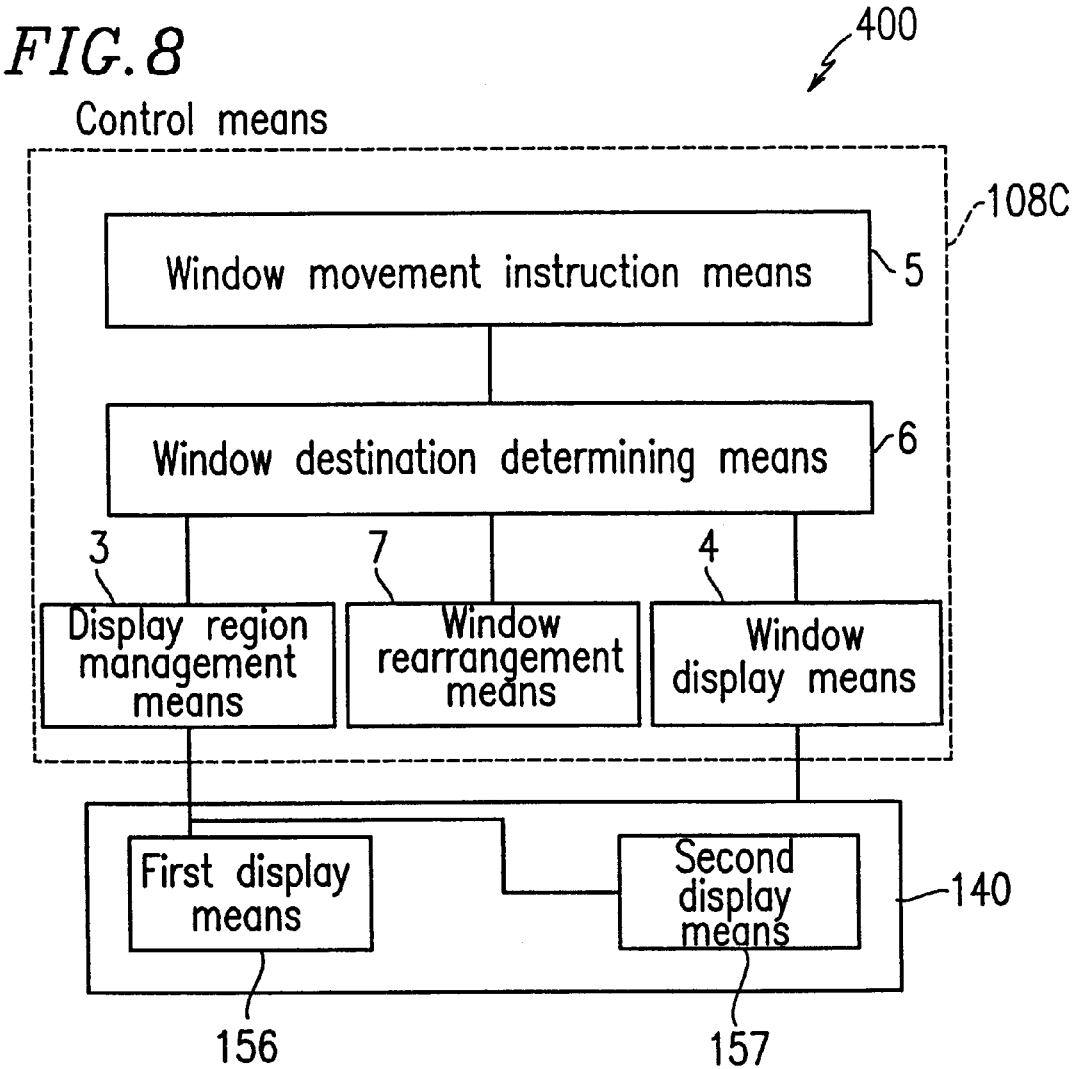
FIG. 8 is a block diagram illustrating a multi-display system 400 according to Example 4 of the present invention.

Example 4 is directed to a process of moving a window(s) which has a relatively high priority level for display among a plurality of display means, and thereafter uniformizing the arrangement of windows on each of a plurality of display means. FIG. 8 is a block diagram illustrating a multi-display system 400 according to Example 4 of the present invention. The component elements which also appear in the multi-display system 100 described in Example 1 with reference to FIG. 1 are denoted by the same reference numerals as those used therein, and the detailed descriptions thereof are omitted.

The multi-display system 400 includes: display means 140 including a first display means 156 and a second display means 157; and a control means 108C for controlling the first display means 156 and the second display means 157. The control means 108C includes: a display region management means 3 for managing display regions for windows which are to be displayed on the first display means 156 or the second display means 157; a window display means 4 for displaying windows on the first display means 156 or the second display means 157 in accordance with the window display regions as managed by the display region management means 3; a window movement instruction means 5 for instructing a movement pattern between the first display means 156 and the second display means 157; a window destination determining means 6 for determining a destination to which a window is to be moved according to an instruction from the window movement instruction means 5; and window rearrangement means 7 for altering the positions of the windows displayed on the first display means 156 and the second display means 157 based on the window destinations as determined by the window destination determining means 6 so that the arrangement of the windows displayed on each of the first display means 156 and the second display means 157 is uniformized.

Figure 9:
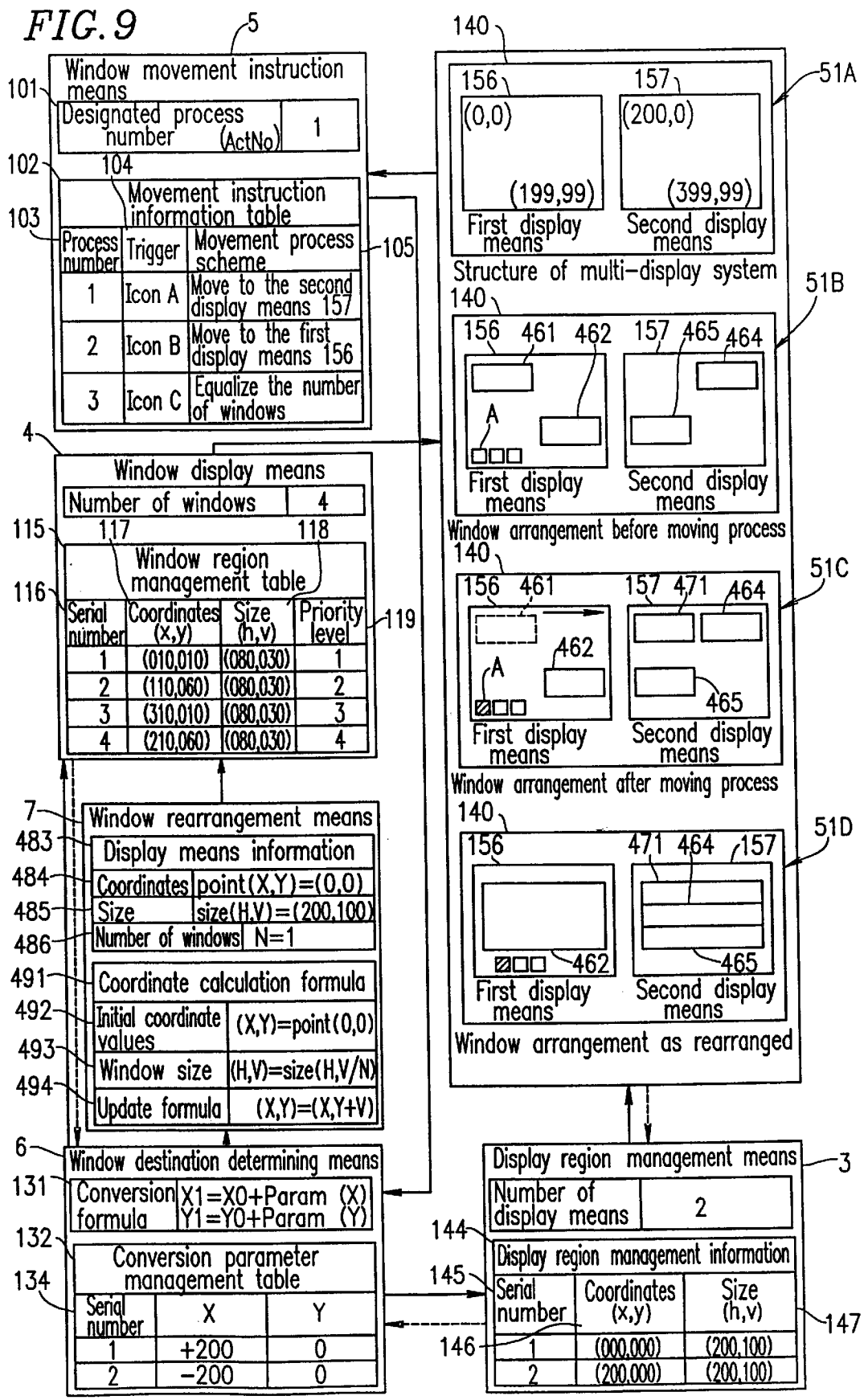
FIG. 9 is a diagram illustrating a process of moving a window which has a relatively high priority level for display among a plurality of display means and thereafter uniformizing the arrangement of windows on each of a plurality of display means through an icon operation, according to Example 4 of the present invention.

FIG. 9 is a diagram illustrating a process of moving a window(s) which has a relatively high priority level for display among a plurality of display means, and thereafter uniformizing the arrangement of windows on each of a plurality of display means. As described above with reference to FIG. 8, the display means 140 in the multi-display system 400 according to Example 4 of the present invention includes the first display means 156 and the second display means 157, as shown in a display state 51A in FIG. 9. As shown in the display state 51A in FIG. 9, the entire display region on the first display means 156 spans a range defined by X-Y coordinates (0,0) and X-Y coordinates (199,99), whereas the entire display region on the second display means 157 spans a range defined by X-Y coordinates (200,0) and X-Y coordinates (399,99).

A display state 51B shown in FIG. 9 represents a state of windows displayed on the first display means 156 and the second display means 157 before a moving process is performed. On the first display means 156, a window 461 is displayed in a display region whose span can be defined by X-Y coordinates (10,10) and X-Y coordinates (89,39), and a window 462 is displayed in a display region whose span can be defined by X-Y coordinates (110,60) and X-Y coordinates (189,89). On the second display means 157, a window 464 is displayed in a display region whose span can be defined by X-Y coordinates (310,10) and X-Y coordinates (389,39), and a window 465 is displayed in a display region whose span can be defined by X-Y coordinates (210,60) and X-Y coordinates (289,89).

First, the initialization of various management tables employed in the respective means will be described.

As shown in FIG. 9, the display region management means 3 includes display region management information 144. For each and every one of the display means that are coupled to the display region management means 3 (i.e., the first display means 156 and the second display means 157 in this case), a serial number 145, coordinate information 146 defining the entire display region, and size information 147 are set in the display region management information 144.

In the present example, as shown in FIG. 9, the first display means 156 has assigned thereto a serial number "1", coordinate information (0,0) defining its entire display region, and information (200,100) representing the size of the entire display region. The second display means 157 has assigned thereto a serial number "2", coordinate information (200,0) defining its entire display region, and information (200,100) representing the size of the entire display region.

The window display means 4 includes a window region management table 115 for managing a number of windows which are displayed on all of the display means (i.e., the first display means 156 and the second display means 157) which are managed by the display region management means 3. For each window, the window display means 4 sets in the window region management table 115: a serial number 116, coordinates 117 at which the window is displayed, displayed size 118, and a priority level for display 119.

According to the present example, in the display state 51B in FIG. 9, the windows 461 and 462 displayed on the first display means 156 have serial numbers "1" and "2" assigned thereto, respectively. The windows 464 and 465 displayed on the second display means 157 have serial numbers "3" and "4" assigned thereto, respectively. For each of the windows 461, 462, 464, and 465, the coordinates 117, the displayed size 118, and the priority level for display 119 are set as shown in FIG. 9.

In the movement instruction information table 102, the window movement instruction means 5 sets various movement process schemes 105 which are applicable to windows that are displayed on all of the display means managed by the display region management means 3, as well as process numbers 103 and triggers 104 for such movement processes.

In the present example, it is assumed that one of the following three movement processes can be instructed as a movement process scheme 105 for a window: "move to the second display means 157", "move to the first display means 156", and "equalize the number of windows" (to be displayed on the first display means 156 and the second display means 157). For each movement process, one of process numbers "1" to "3" and a trigger for the movement process "(click on) icon A", "(click on) icon B", or "(click on) icon C" are assigned and stored in the movement instruction information table 102.

The window destination determining means 6 has a conversion formula 131 for calculating the coordinates of a destination for a window. The window destination determining means 6 sets, in a conversion parameter management table 132, a conversion parameter (X) along a horizontal direction and a conversion parameter (Y) along a vertical direction, which are to be used in the conversion formula 131. For each set of conversion parameters X and Y, a serial number 134 which is equal to the process number 103 of each movement process specified by the respective movement process scheme 105 as set in the movement instruction information table 102 is assigned.

In the present example, (+200, 0) is set in the conversion parameter management table 132, together with serial number "1", as conversion parameters (X, Y) corresponding to the movement process "move to the second display means 157" represented by process number "1" in the movement instruction information table 102. Similarly, (−200, 0) is set in the conversion parameter management table 132, together with serial number "2", as conversion parameters (X, Y) corresponding to the movement process "move to the first display means 156" represented by process number "2" in the movement instruction information table 102.

Now, a process of moving a window(s) which has a relatively high priority level for display among a plurality of display means, and thereafter uniformizing the arrangement of windows on each of a plurality of display means, will be described. Similarly to Example 1, the priority level for display of a given window according to Example 4 is determined by and changes with the length of time which has elapsed since a most recent operation was performed to that window, such that the highest priority level is given to a window(s) for which the shortest time has elapsed since a most recent operation was performed thereto. Accordingly, it can be inferred that any number of windows which have high priority levels for display are the window(s) which the operator is currently working on.

As shown in the display state 51C in FIG. 9, if the window movement instruction means 5 detects a click event ("first predetermined input") indicating that icon A has been clicked on with a mouse, the window movement instruction means 5 checks whether or not the detected event corresponds to a trigger 104 in the movement instruction information table 102. Since the click event indicating that icon A has been clicked on with a mouse corresponds to a trigger 104 in the movement instruction information table 102, the window movement instruction means 5 sets process number "1", which corresponds to the trigger 104 indicating that icon A has been clicked on with a mouse, in a designated process number 101. Accordingly, process number "1" is passed to the window destination determining means 6.

The window destination determining means 6 checks the window region management table 115 in the window display means 4, and acquires the coordinates of a window which has the highest priority level for display. If the acquired coordinates do not fit within the display region of the second display means 157, the window destination determining means 6 calculates the coordinates of an appropriate destination for this window in accordance with the conversion formula 131, using the conversion parameters (X, Y) associated with serial number "1" in the conversion parameter management table 132. The coordinates of the window 461 corresponding to process number "1" stored in the window region management table 115 are updated with the calculated coordinates.

As shown in the display state 51C in FIG. 9, the window display means 4 redisplays the window 461 as the window 471 based on the updated coordinates of the window 461 in the window region management table 115 associated with process number "1".

The window rearrangement means 7 uniformizes the arrangement of windows displayed on each of the display means (i.e., the first display means 156 and the second display means 157). First, the window 462 displayed on the first display means 156 is subjected to an arrangement uniformization process. As shown in FIG. 9, according to the present example, the coordinates and the size information corresponding to serial number "1" are acquired from the display region management information 144, and coordinates 484 and size 485, which are included in display means information 483 contained in the window rearrangement means 7, are initialized to (0,0) and (200,100), respectively. Based on the number of windows displayed on the first display means 156, which is acquired from the window display means 4, number of windows 486 is initialized to "1". Coordinates (x, y) and size (h, v) are calculated by using a coordinate calculation formula 491, and these values are set back into the window region management table 115. As a result, the window 462 is displayed on the first display means 156 in a maximum size, as shown in a display state 51D.

Next, the windows 464, 465, and 471 displayed on the second display means 157 are subjected to an arrangement uniformization process. As shown in FIG. 9, according to the present example, the coordinates and the size information corresponding to serial number "2" are acquired from the display region management information 144, and the coordinates 484 and size 485, which are included in the display means information 483 contained in the window rearrangement means 7, are initialized to (0,0) and (200,100), respectively. Based on the number of windows displayed on the second display means 157, which is acquired from the window display means 4, the number of windows 486 is initialized to "3". Coordinates (x, y) and size (h, v) for the respective windows 464, 465, and 471 are calculated by using the coordinate calculation formula 491, and these values are set back into the window region management table 115. As a result, the windows 464, 465, and 471 are displayed on the second display means 157 in a uniform size, as shown in a display state 51D.

Figure 10A:
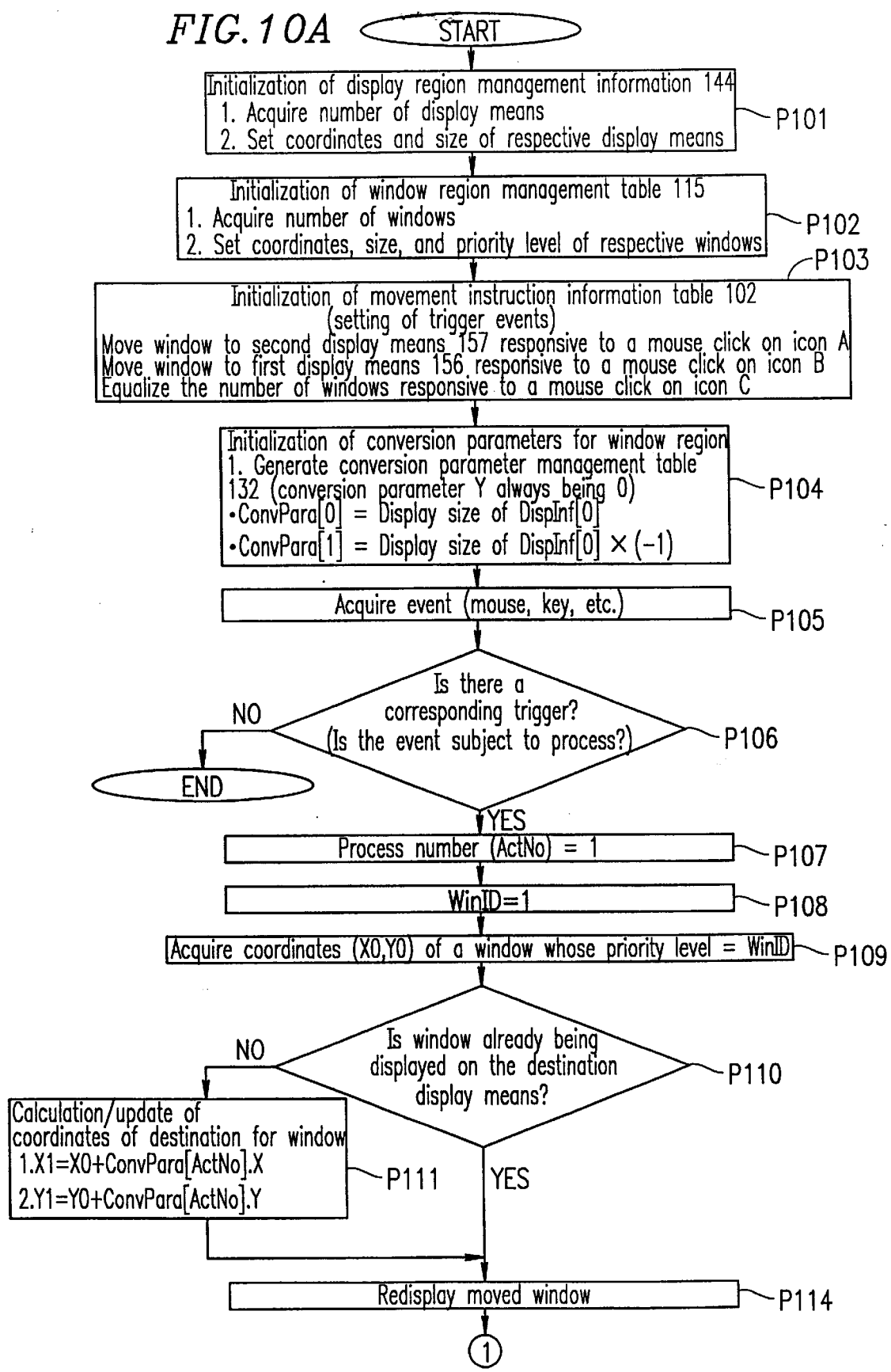
FIG. 10A is a flowchart illustrating a process of moving a window having a relatively high priority level for display among a plurality of display means according to Example 4 of the present invention.
Figure 10B:
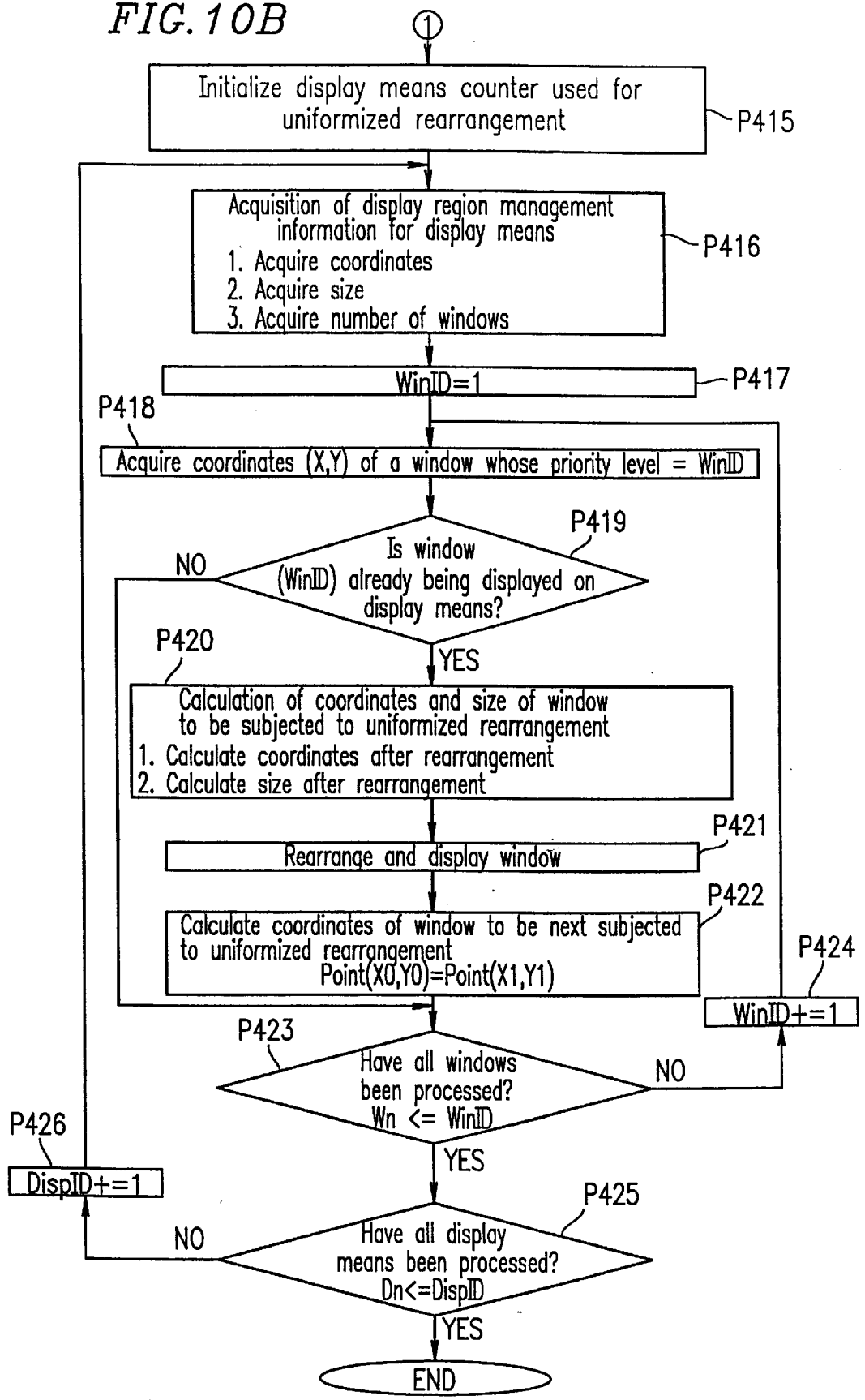
FIG. 10B is a flowchart illustrating an ensuing process of uniformizing the arrangement of windows on each of a plurality of display means according to Example 4 of the present invention.

FIGS. 10A and 10B are flowcharts respectively illustrating a process of moving a window having a relatively high priority level for display among a plurality of display means, and an ensuing process of uniformizing the arrangement of windows on each of a plurality of display means according to Example 4 of the present invention. The steps which also appear in the process of moving a window having a relatively high priority level for display among a plurality of display means described with reference to the flowchart of FIG. 3 are denoted by the same reference numerals as those used therein, and the detailed descriptions thereof are omitted.

At step P101, the display region management means 3 detects all of the display means which are coupled to the display region management means 3, and stores the number of such display means. Moreover, the display region management means 3 sets in the display region management information 144 the respective serial numbers 145 identifying all of the display means coupled to the display region management means 3, as well as the coordinate information defining the entire display region 146 of each display means, and information representing the size of the entire display region 147 of each display means.

At step P102, the window display means 4 detects the windows which are displayed on all of the display means coupled to the display region management means 3 and stores the number of such windows. For each window, the window display means 4 sets in the window region management table 115: a serial number 116, coordinates 117 at which the window is displayed, displayed size 118, and a priority level for display 119.

At step P103, the window movement instruction means 5 sets in the movement instruction information table 102 various movement process schemes 105 which are applicable to windows that are displayed on all of the display means managed by the display region management means 3, as well as process numbers 103 and triggers 104 for such movement processes. At step P104, the window destination determining means 6 sets in the conversion parameter management table 132 a set of conversion parameters to be used in the conversion formula 131 for calculating the coordinates of a destination for the relevant window. At step P105, input events from a mouse or a keyboard are checked at regular periods of time and such events are acquired as triggers.

At step P106, the window movement instruction means 5 checks whether or not the trigger acquired at step P105 is a "(click on) icon A" event among the triggers 104 which were set in the movement instruction information table 102 at step P103. If the acquired trigger is not the "(click on) icon A" event among the triggers which were set in the movement instruction information table 102 at step P103 (following the "NO" path from step P106), then the process is terminated. If the acquired trigger is the "(click on) icon A" event among the triggers which were set in the movement instruction information table 102 at step P103 (following the "YES" path from step P106), then the process proceeds to step P107.

At step P107, a process number corresponding to the trigger acquired at step P106 is stored in the designated process number 101 in the window movement instruction means 5. At step P108, a window-identification counter WinID is initialized to "1" At step P109, the coordinates of a window having a priority level which is designated by the window-identification counter WinID are acquired from the window region management table 115.

At step P110, from the coordinates of the window having a priority level which is designated by the window-identification counter WinID (acquired at step P109), the window destination determining means 6 determines whether or not the window is already being displayed on the destination display means. If the window is already displayed, the process proceeds to step P114. If the window is not displayed, the process proceeds to step P111.

At step P111, the window destination determining means 6 calculates the coordinates of a destination for the window having a priority level which is designated by the window-identification counter WinID, and updates the coordinates stored in the window region management table 115 with the calculated coordinates of the destination. At step P114, the window display means 4 redisplays the window in accordance with the coordinates in the window region management table 115, as updated by the window destination determining means 6 at step P111.

At step P415, a display means counter which denotes a display means (i.e., the first display means 156 or the second display means 157) is initialized. At step P416, the display means information 483 corresponding to the display means (i.e., the first display means 156 or the second display means 157) which is denoted by the display means counter is acquired from the display region management information 144 and the window region management table 115.

At step P417, a window-identification counter WinID is initialized to "1". At step P418, the coordinates of a window having a priority level which is designated by the window-identification counter WinID are acquired. At step P419, it is determined whether or not the window corresponding to the acquired coordinates is already being displayed on the display means denoted by the display means counter. If the window is already displayed (following the "YES" path from step P419), the process proceeds to step P420. If the window is not already displayed (following the "NO" path from step P419), the process proceeds to step P423.

At step P420, the coordinates and size of the window to be subjected to uniformized rearrangement are calculated in accordance with the coordinate calculation formula 491 contained in the window rearrangement means 7. At step P421, the rearranged window is displayed. At step P422, the coordinates (displayed position) of a window to be next subjected to uniformized rearrangement are calculated.

At step 423, in order to ensure that all of the windows that are displayed on the display means denoted by the display means counter are subjected to uniformized rearrangement, it is determined whether or not all of the windows have been processed (i.e., as known by the absence of a window having the next highest priority level for display). If there is not a window having the next highest priority level for display (following the "YES" path from step P423), the process proceeds to step P425. If such a window exists (following the "NO" path from step P423), the process proceeds to step P424. At step P424, the priority level for display (i.e., window-identification counter WinID) is incremented by one, and the process proceeds to step P418.

At step 425, in order to ensure that the windows that are displayed on all of the display means are subjected to uniformized rearrangement, it is determined whether or not all of the display means (i.e., the first display means 156 or the second display means 157) have been processed (i.e., as known by the absence of an unprocessed display means). If there is no unprocessed display means left (following the "YES" path from step P425), the process is terminated. If such a display means exists (following the "NO" path from step P425), the process proceeds to step P426.

At Step P426, the display means counter is incremented by one, and the process proceeds to step P416.

Although the mouse events "(click on) icon A" and "(click on) icon C" are illustrated as the triggers for the movement processes associated with process numbers "1" and "3", respectively, in the movement instruction information table 402 according to Example 4 of the present invention, the present invention is not limited to such a configuration. The trigger for the movement process associated with process number "1" or "3" may be represented by information representing relative locations of the two display means. For example, may be the information "the first display means and the second display means form an angle in the range of 0° to 179°" and the information "the first display means and the second display means form an angle in the range of 180° to 359°" may be used as the triggers for the movement processes associated with process numbers "1" and "3", respectively. In this case, the window movement instruction means 5 may receive information representing the relative locations of the first display means 156 and the second display means 157, and the relative locations of the two display means may be monitored to detect any change therein, e.g., the first display means 156 and the second display means 157 being placed in an opposite (or back-to-back) placement.

As described above, according to Example 4 of the present invention, the windows 464 and 465, which are displayed on the second display means 157 and the window 471, which has been moved from the first display means 457 to the second display means 458, can automatically be displayed in equal size, in response to a trigger which is input to the window movement instruction means 5 by means of a mouse, for example.

Thus, according to the present invention, there is provided a multi-display system such that, when windows are to be moved between display means, an operation which is associated with a predetermined trigger is activated by a simple operation by an operator, thereby moving a plurality of windows from one display means to another display means.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A multi-display system comprising:
    first display means for displaying a plurality of first windows;
    second display means; and
    control means for controlling the first display means and the second display means,
    wherein, in response to a first predetermined input, the control means moves at least two of the plurality of first windows displayed on the first display means from the first display means onto the second display means,
    wherein the control means comprises window movement instruction means for instructing a movement pattern for the at least two first windows moved from the first display means onto the second display means in response to the first predetermined input.

2. A multi-display system according to claim 1, wherein the control means moves all of the plurality of first windows displayed on the first display means from the first display means onto the second display means.

3. A multi-display system according to claim 1, wherein, in response to a second predetermined input, the control means moves at least one of the plurality of first windows displayed on the first display means from the first display means onto the second display means, in such a manner that a difference between a number of windows displayed on the first display means and a number of windows displayed on the second display means is one or less.

4. A multi-display system according to claim 3, wherein the control means comprises window movement instruction means for instructing a movement pattern for the at least one first window moved from the first display means onto the second display means in response to the second predetermined input.

5. A multi-display system according to claim 3, wherein the control means selects the at least on first window to be moved from the first display means onto the second display means in response to the second predetermined input, based on a predetermined priority level.

6. A multi-display system according to claim 5, wherein the predetermined priority level is determined based on a length of time which has elapsed since a most recent operation was performed to a window.

7. A multi-display system according to claim 1, wherein:
    the second display means displays at least one second window; and
    the control means controls the second display means so as to display the at least one second window and the at least two first windows moved from the first display means onto the second display means in equal size.

8. A multi-display system according to claim 1, wherein the control means further comprises:
    window display means for displaying the at least two first windows on the first display means or on the second display means, based on display coordinate information representing locations at which the at least two first windows are to be displayed; and
    window destination determining means for updating the display coordinate information based on the movement patterns instructed by the window movement instruction means.

9. A multi-display system according to claim 8, further comprising display region management means for managing a display region for a window to be displayed on the first display means or the second display means,
    wherein the window display means displays the window based on the display region as managed by the display region management means.

10. A multi-display system according to claim 1, wherein the first predetermined input is input to the control means as a result of a single operation.

11. A multi-display system according to claim 1, wherein the first display means and the second display means are placed back-to-back.

12. A multi-display system according to claim 1, wherein the first predetermined input comprises at least one of: an icon click; a key input; and information representing relative locations of the first display means and the second display means.

13. A method for moving windows in a multi-display system comprising:
    a first step of displaying a plurality of first windows on first display means; and
    a second step of for controlling the first display means and the second display means,
    wherein, the second step comprises, in response to a first predetermined input, moving at least two of the plurality of first windows displayed on the first display means from the first display means onto the second display means, and
    wherein the second step comprises a third step of instructing a movement pattern for the at least two first windows moved from the first display means onto the second display means in response to the first predetermined input.

14. A method according to claim 13, wherein the second step comprises moving all of the plurality of first windows displayed on the first display means from the first display means onto the second display means.

15. A method according to claim 13, wherein, the second step comprises, in response to a second predetermined input, moving at least one of the plurality of first windows displayed on the first display means from the first display means onto the second display means, in such a manner that a difference between a number of windows displayed on the first display means and a number of windows displayed on the second display means is one or less.

16. A method according to claim 15, wherein the second step comprises instructing a movement pattern for the at least one first window moved from the first display means onto the second display means in response to the second predetermined input.

17. A method according to claim 15, wherein the second step comprises selecting the at least one first window to be moved from the first display means onto the second display means in response to the second predetermined input, based on a predetermined priority level.

18. A method according to claim 17, wherein the predetermined priority level is determined based on a length of time which has elapsed since a most recent operation was performed to a window.

19. A method according to claim 13, wherein:
the second display means displays at least one second window; and
the second step comprises controlling the second display means so as to display the at least one second window and the at least two first windows moved from the first display means onto the second display means in equal size.

20. A method according to claim 13, wherein the second step further comprises:
a fourth step for displaying the at least two first windows on the first display means or on the second display means, based on display coordinate information representing locations at which the at least two first windows are to be displayed; and
a fifth step for updating the display coordinate information based on the movement pattern instructed in the third step.

21. A method according to claim 20, wherein the second step comprises a sixth step for managing a display region for a window to be displayed on the first display means or the second display means,
wherein the fourth step comprises displaying the window based on the display region as managed in the sixth step.

22. A method according to claim 13, wherein the first predetermined input is input as a result of a single operation.

23. A method according to claim 13, wherein the first display means and the second display means are placed back-to-back.

24. A method according to claim 13, wherein the first predetermined input comprises at least one of: an icon click; a key input; and information representing relative locations of the first display means and the second display means.

25. A multi-display system according to claim 1, wherein the first display means and the second display means operate simultaneously.

26. A multi-display system according to claim 1, wherein
the first display means spans a range defined by a first set of X-Y coordinates,
the second display means spans a range defined by a second set of X-Y coordinates, and
wherein the first set of X-Y coordinates and the second set of X-Y coordinates are contiguous so that they form a continuous set of X-Y coordinates comprising the first and second sets of X-Y coordinates.

27. A method according to claim 13, wherein the first display means and the second display means operate simultaneously.

28. A method according to claim 13, wherein
the first display means spans a range defined by a first set of X-Y coordinates,
the second display means spans a range defined by a second set of X-Y coordinates, and
wherein the first set of X-Y coordinates and the second set of X-Y coordinates are contiguous so that they form a continuous set of X-Y coordinates comprising the first and second sets of X-Y coordinates.

* * * * *